(12) United States Patent
Hirakata et al.

(10) Patent No.: US 7,847,897 B2
(45) Date of Patent: Dec. 7, 2010

(54) OPTICAL COMPENSATION FILM AND LIQUID CRYSTAL DISPLAY

(75) Inventors: Junichi Hirakata, Minami-Ashigara (JP); Kentaro Toyooka, Minami-Ashigara (JP); Hiroyuki Mori, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1357 days.

(21) Appl. No.: 11/088,993

(22) Filed: Mar. 24, 2005

(65) Prior Publication Data

US 2005/0162592 A1    Jul. 28, 2005

(30) Foreign Application Priority Data

Mar. 26, 2004    (JP) .............................. 2004-091862

(51) Int. Cl.
*G02F 1/1335*    (2006.01)
(52) U.S. Cl. .................. 349/119; 349/117; 349/121
(58) Field of Classification Search ....................... None
See application file for complete search history.

(56) References Cited

U.S. PATENT DOCUMENTS

| | | | | |
|---|---|---|---|---|
| 6,064,457 | A  * | 5/2000 | Aminaka ..................... | 349/117 |
| 6,912,030 | B1 * | 6/2005 | Coates et al. ............... | 349/119 |
| RE39,082 | E  * | 5/2006 | Kubo et al. .................. | 349/114 |
| 7,084,945 | B2 * | 8/2006 | Nair et al. ................... | 349/122 |
| 7,193,670 | B2 * | 3/2007 | Mi .............................. | 349/119 |
| 2003/0107693 | A1 * | 6/2003 | Yamahara ................... | 349/117 |

FOREIGN PATENT DOCUMENTS

| | | |
|---|---|---|
| JP | 4-162018 | 6/1992 |
| JP | 6-214116 | 8/1994 |
| JP | 10-186356 | 7/1998 |
| JP | 11-271760 A | 10/1999 |

* cited by examiner

*Primary Examiner*—Richard H Kim
(74) *Attorney, Agent, or Firm*—Buchanan Ingersoll & Rooney PC

(57) ABSTRACT

To provide a liquid crystal display, particularly TN type liquid crystal display capable of remarkably improving brightness inversion resistance at a high contrast with a simple configuration and an optical compensation film which realizes the aforementioned properties, the liquid crystal display includes a pair of polarizing plates, each of the polarizing plates being disposed on an outer side of a liquid crystal layer having a twisted structure, the liquid crystal layer being disposed between substrates facing to each other, at least one of the substrates having an electrode, each of the polarizing plates including a polarizing film, a protective film, and an optical compensation film, wherein the optical compensation film includes a compound having a discotic structure unit, and the compound having a discotic structure unit is aligned such that the average alignment direction of the molecular major axis of the discotic structure unit at each side of the upper and lower optical compensation films facing to the polarizing film cross each other at an angle of not greater than the crossing angle of absorption axes of the pair of polarizing plates.

3 Claims, 2 Drawing Sheets

OPTICAL COMPENSATION FILM AND LIQUID CRYSTAL DISPLAY

FIELD OF THE INVENTION

The present invention relates to an optical compensation film and a liquid crystal display comprising same.

BACKGROUND OF THE INVENTION

As a display device for OA devices such as word processor, note personal computer and monitor for personal computer, terminals of cellular phone, television, etc., there has heretofore been mainly used CRT (cathode ray tube). In recent years, liquid crystal displays have been widely used instead of CRT due to their small thickness, light weight and small power consumption.

A liquid crystal display comprises a liquid crystal cell and a polarizing plate. The polarizing plate comprises a protective film and a polarizing film. The polarizing film is obtained by dyeing a polarizing film made of polyvinyl alcohol film with iodine, stretching the polarizing film thus dyed, and then superposing a protective film on the both sides of the polarizing film. A transmissive liquid crystal display comprises this polarizing plate mounted on the both sides of a liquid crystal cell and optionally one or more optical compensation films provided thereon. A reflective liquid crystal display comprises a reflective plate, a liquid crystal cell, one or more optical compensation films and a polarizing plate provided in this order. The liquid crystal cell comprises liquid crystal molecules, two sheets of substrates for enclosing the liquid crystal molecules therein and an electrode layer for applying a voltage to the liquid crystal molecules. As liquid crystal cells there have been proposed those of display modes such as TN (Twisted Nematic), IPS (In-Plane Switching), OCB (Optically Compensatory Bend), VA (Vertically Aligned), ECB (Electrically Controlled Birefringence) and STN (Super Twisted Nematic), which perform ON or OFF display depending on the alignment of the liquid crystal molecules and can be applied to all the transmissive, reflective and semi-transmissive liquid crystal displays.

The optical compensation film is used in various liquid crystal displays to eliminate image discoloration or enhance the viewing angle. As the optical compensation film there has heretofore been used a stretched birefringent polymer film. It has been proposed to use an optical compensation film having an optical anisotropic layer made of a low or high molecular liquid crystalline compound provided on a transparent support instead of the optical compensation film made of stretched birefringent film. The liquid crystalline compound is aligned in various configurations. Thus, the use of the liquid crystalline compound makes it possible to realize optical properties which cannot be obtained with the related art stretched birefringent polymer film. The liquid crystalline compound acts also as a protective film for polarizing plate.

The optical properties of the optical compensation film are determined by the optical properties of the liquid crystal cell, i.e., aforementioned difference of display mode. The use of the liquid crystalline compound makes it possible to produce an optical compensation film having various optical properties corresponding to the various display modes of liquid crystal cell. An optical compensation film comprising a liquid crystalline compound which can operate in various display modes has been already proposed. For example, when a voltage is applied, an optical compensation film for TN mode liquid crystal cell performs optical compensation such that the liquid crystal molecules are aligned obliquely to the surface of the substrate while eliminating the twisted structure thereof, making it possible to enhance the front contrast ratio of the display device and prevent the leakage of light in oblique direction during black display and hence improve the viewing-angle properties of contrast.

Representative examples of optical compensation methods include a method involving the disposition of a set of stretched films having the same phase difference stacked crossing each other to attain an in-plane retardation close to zero between upper and lower polarizing plates and a liquid crystal cell (see JP-A-4-162018).

However, when a voltage is applied, the molecules in the liquid crystal cell are not completely aligned perpendicular to the substrate and those disposed in the periphery of the substrate are left aligned parallel to the substrate. On the other hand, the liquid crystal molecules disposed in the middle region of the substrate are aligned perpendicular to the substrate and the liquid crystal molecules ranging from the middle region of the substrate to the region close to the periphery of the substrate are continuously aligned obliquely to the substrate. In order to optically compensate the aforementioned alignment of the liquid crystal cell, the optical compensation film is preferably provided with the same optical properties.

As a technique for providing such an optical compensation film there has been proposed a technique which comprises forming a liquid crystalline compound into a film while being hybrid-aligned. As such a liquid crystalline compound there is used a discotic liquid crystalline compound (see JP-A-6-214116) or a rod-shaped liquid crystalline compound (see JP-A-10-186356).

However, even when an optical compensation film obtained by uniformly hybrid-aligning a discotic liquid crystalline compound is used, it is extremely difficult to make complete optical compensation of a liquid crystal cell without any problems. For example, TN mode liquid crystal cells show brightness inversion, which is transmittance inversion at various gradations, as viewed obliquely. As an approach for preventing the occurrence of brightness inversion there is known a method involving the limitation of the tilt angle range of the liquid crystal molecules in the liquid crystal cell (see TECHNICAL REPORT OF IEICE, EID2001-108, pp. 47-52). However, this method leaves something to be desired.

SUMMARY OF THE INVENTION

An object of the invention is to provide a liquid crystal display, particularly TN type liquid crystal display capable of remarkably improving the resistance to brightness inversion at a high contrast with a simple configuration.

Another object of the invention is to provide an optical compensation film which allows a liquid crystal display, particularly liquid crystal display to perform remarkably improved brightness inversion resistance at a high contrast.

In accordance with the invention, a liquid crystal display and an optical compensation film having the following configurations are provided to accomplish the objects of the invention. Exemplary aspects include, for example, the following items 1 to 7:

1. A liquid crystal display comprising:
   a pair of a upper polarizing plate and a lower polarizing plate; and
   a liquid crystal cell between the upper and lower polarizing plates, the liquid crystal cell comprising: a pair of substrates facing to each other, at least one of the pair of the substrates having an electrode; and a liquid crystal layer between the pair of the substrates, the liquid crystal layer having a twisted structure of a liquid crystal,
wherein
the upper polarizing plate comprises an upper optical compensation film; an upper polarizing film; and a protective film in this order, the upper optical compensation film being between the upper polarizing film and the liquid crystal cell;
the lower polarizing plate comprises a lower optical compensation film; a lower polarizing film; and a protective film in this, the lower optical compensation film being between the lower polarizing film and the liquid crystal cell;
each of the upper and lower optical compensation films comprises a compound having a discotic structure unit; and
the compound is aligned such that
the upper optical compensation film has an average alignment direction of a molecular major axis of the discotic structure unit,
the lower optical compensation film has another average alignment direction of the molecular major axis of the discotic structure unit, and
the alignment direction of the upper optical compensation film at a side of the upper optical compensation film facing to the upper polarizing film and the alignment direction of the lower optical compensation film at a side of the lower optical compensation facing to the lower polarizing film cross each other at an angle of not greater than a crossing angle of absorption axes of the upper and lower polarizing plates.

2. The liquid crystal display as described in item 1, which has a crossing angle of the alignment directions of the upper and lower optical compensation films, the crossing angle being not greater than a twist angle of the twisted structure.

3. The liquid crystal display as described in item 1 or 2, wherein at least one of the upper and lower optical compensation films has average alignment directions of the molecular major axis of the discotic structure unit, the alignment directions differing between at a side of the at least one of the upper and lower optical compensation films facing to the liquid crystal cell and at a side of the at least one of the upper and lower optical compensation films facing to the polarizing film.

4. The liquid crystal display as described in any one of items 1 to 3, wherein each of the upper and lower optical compensation films comprises: a first optical anisotropic layer; and a second optical anisotropic layer, each of the first and second optical anisotropic layers comprising a liquid crystalline compound; and
the first optical anisotropic layer has an alignment direction of the liquid crystalline compound, the second optical anisotropic layer has another alignment direction of the liquid crystalline, and the alignment directions of the first and second optical anisotropic layer differ from each other.

5. A liquid crystal display comprising:
a pair of polarizing films;
a liquid crystal cell between the pair of the polarizing films, the liquid crystal cell comprising: a pair of substrates facing to each other, at least one of the pair of the substrates having an electrode; and a liquid crystal layer between the pair of the substrates; and
at least one optical compensation film between the pair of the polarizing films,
wherein
when the at least one optical compensation film is removed from the liquid crystal display leaving the other constitutions unchanged, the liquid crystal display has a ratio of T2(Vw) to T2(Vb) of less than 100:1, wherein T2(Vw) represents a transmittance from an anterior view in a white display state at an applied voltage Vw, Vw represents an applied voltage so as to provide the white diplay state, T2(Vb) represents a transmittance from an anterior view in a black display state at an applied voltage Vb, and Vb represents an applied voltage so as to provide the black diplay state;
the optical compensation film satisfies a condition that when the optical compensation film is interposed between a pair of polarizing elements arranged in cross nicol configuration to provide a layer product, and the optical compensation film is rotated on a direction normal to a surface of the optical compensation film as a rotary axis, the layered product has a light transmittance of more than zero at all angles of rotation;
the liquid crystal display has a ratio of T1(Vw) to T1(Vb) of 100:1 or more, wherein T1(Vw) represents a transmittance from an anterior view in the white display state at the applied voltage Vw, and T1(Vb) represents a transmittance from an anterior view in the black display state at the applied voltage Vb; and
the liquid crystal display has a ratio of a maximum value of the transmittance in the black display state to T1 (Vw) of 10% or less at an azimuth angle of 60° from a direction normal to the substrates.

6. The liquid crystal display as described in item 5, wherein the optical compensation film comprises: a first optical anisotropic layer; and a second optical anisotropic layer, each of the first and second optical anisotropic layers comprising a liquid crystalline compound; and
the first optical anisotropic layer has an alignment direction of the liquid crystalline compound, the second optical anisotropic layer has another alignment direction of the liquid crystalline, and the alignment directrions of the first and second optical anisotropic layer differ from each other.

7. An optical compensation film as defined in any one of items 1 to 6.

In the liquid crystal display of item 5, it is preferred that the optical compensation film has an optical anisotropic layer formed from a liquid crystalline compound on a transparent support (protective film) and the controlled alignment directions of the liquid crystalline compound on the side of the optical anisotropic layer in contact with the transparent support and the side of the optical anisotropic layer opposed to the transparent support differ from each other. As the liquid crystalline compound there is preferably used a discotic liquid crystalline compound or rod-shaped liquid crystalline compound.

The pretilt angle of the liquid crystal molecules in the liquid crystal layer of the aforementioned display with respect to the surface of the substrate is about 0 degree when the applied voltage is zero but gradually increases with the rise of the applied voltage and then reaches a range of from 70 degrees to 80 degrees when the voltage for black display is applied. In the invention, black display is effected when the pretilt angle is less than 70 degrees, i.e., from 50 degrees to 70 degrees. The average pretilt angle of the liquid crystal molecules can be determined from the applied voltage and the change of the electrostatic capacity of the liquid crystal layer.

In accordance with the invention, a liquid crystal display, particularly TN type liquid crystal display which exhibits a remarkably improved front contrast ratio, little or no downward brightness inversion and a remarkably enhanced viewing angle with a simple configuration can be provided. An optical compensation film and an ellipsoidal polarizing plate which can contribute to optical compensation of a liquid crystal display, particularly TN type liquid crystal display can be also provided.

DETAILED DESCRIPTION OF THE INVENTION

The constituent members of an embodiment of implementation of the liquid crystal display of the invention will be sequentially described hereinafter.

The terms "45°", "parallel" and "orthogonal" as used herein are meant to indicate that they fall within a range of from the value obtained by subtracting less than 5° from the accurate angle to the value obtained by adding less than 5° to the accurate angle. The tolerated difference from the accurate angle is preferably less than 4°, more preferably less than 3°. Referring to the sign of angle, "+" means counterclockwise direction while "−" means clockwise direction. The term "slow axis" as used herein is meant to indicate the direction in which the refractive index reaches maximum.

The term "visible light range" as used herein is meant to indicate the wavelength range of from 380 nm to 780 nm. The wavelength at which the refractive index is measured is λ of 550 nm in the visible light range unless otherwise specified.

Figure 1:
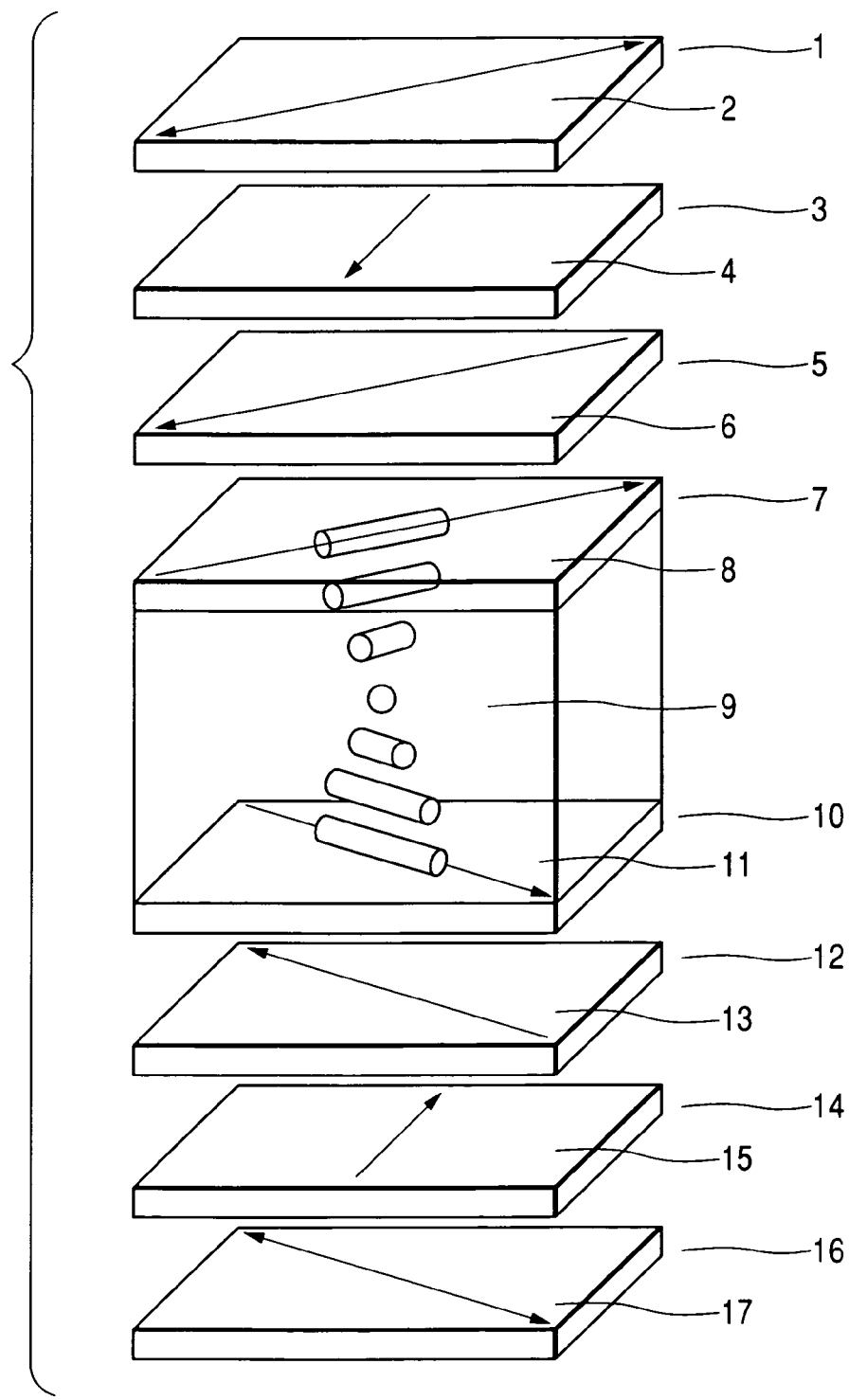
FIG. 1 is a schematic diagram illustrating an embodiment of implementation of the liquid crystal display according to the invention.

FIG. 1 is a typical diagram illustrating an embodiment of implementation of the liquid crystal display of the invention.

In FIG. 1, the liquid crystal display comprises a liquid crystal cell (comprising an upper substrate 7, a lower substrate 10 and a liquid crystal layer made of liquid crystal molecules 9 provided interposed therebetween) and a pair of polarizing plates 1 and 16 provided on the respective outer side of the liquid crystal cell. The polarizing plate comprises a polarizing film and a pair of transparent protective films having the polarizing film provided interposed therebetween. In FIG. 1, the polarizing film is shown in an integrated form rather than in a detailed form.

Between the liquid crystal cell and the pair of polarizing films are provided respectively an optical compensation film composed of an upper first optical anisotropic layer 5 and an upper second optical anisotropic layer 3 and an optical compensation film composed of a lower first optical anisotropic layer 12 and a lower second optical anisotropic layer 14, which are disposed symmetrically about the liquid crystal cell.

The lower protective film (not shown) of the upper polarizing plate 1 acts also as a support for the upper first optical anisotropic layer 5 and the upper second optical anisotropic layer 3. The upper polarizing plate 1 is assembled into the liquid crystal display as an integrated structure with the upper second optical anisotropic layer 3 and the upper first optical anisotropic layer 5. On the other hand, the upper protective film (not shown) of the lower polarizing plate 16 acts also as a support for the lower first optical anisotropic layer 12 and the lower second optical anisotropic layer 14. The lower polarizing plate 16 is assembled into the liquid crystal display as an integrated structure with the lower first optical anisotropic layer 12 and the lower second optical anisotropic layer 14.

In the invention, at least one of the polarizing plates may be in the form of a layered product of a polarizing plate and an optical anisotropic layer (For example, the upper polarizing plate may be a layered product of upper polarizing plate 1 and optical anisotropic layer 3). It is not necessary that both the polarizing plates be a layered product having the aforementioned structure as shown in FIG. 1. While FIG. 1 illustrates an embodiment comprising two optical anisotropic layers stacked on each other, the invention is not limited thereto. The liquid crystal display of the invention may be a structure having a polarizing plate and at least one optical anisotropic layer integrally stacked on each other.

In the liquid crystal display of the invention, the transparent support for the optical compensation film can act as a protective film for one side of the polarizing film. Therefore, an integrated polarizing plate comprising an integrated structure having a protective film and an optical compensation film obtained by stacking sequentially a transparent protective film, a polarizing plate, a transparent protective film (which acts also as a transparent support) and an optical anisotropic layer may be used (The optical compensation film acts also as a protective film). The integrated polarizing plate not only has a polarizing capacity but also contributes to the enhancement of viewing angle and the elimination of unevenness in display. Further, the integrated polarizing plate comprises an optical anisotropic layer having an optical compensating capacity, making it possible to accurately make optical compensation of the liquid crystal display with a simple configuration. In order to prepare the integrated polarizing plate, it is preferred that the optical anisotropic layer be disposed far from the liquid crystal cell of the liquid crystal display, that is, the stacking be made in the order of transparent protective film, polarizing film, transparent support and optical anisotropic layer.

The absorption axes 2 and 17 of the polarizing plates 1 and 16, respectively, and the alignment of the optical anisotropic layers 3, 5, 12 and 14 and the liquid crystal molecules 9 may be adjusted to an optimum range depending on the material of the various members, the display mode, the layered structure of the members, etc. In order to obtain a high contrast, alignment is made such that the absorption axis 2 of the polarizing plate 1 and the absorption axis 17 of the polarizing plate 16 cross substantially each other. However, the liquid crystal display of the invention is not limited to the aforementioned configuration.

The liquid crystal display and optical compensation film of the invention will be further described in connection with FIG. 1.

(Liquid Crystal Display)

The liquid crystal cell comprises an upper substrate 7, a lower substrate 10, and a liquid crystal layer containing liquid crystal molecules 9 disposed interposed therebetween. The substrates 7 and 10 each have an alignment layer (not shown) formed on the surface thereof in contact with the liquid crystal molecules 9 (hereinafter occasionally referred to as "inner surface"). The alignment layer is subjected to rubbing or the like to control the alignment of the liquid crystal molecules 9 when the applied voltage is zero or low. The substrates 7 and 10 each also have a transparent electrode (not shown) formed on the inner surface thereof which can apply a voltage to the liquid crystal layer made of liquid crystal molecules 9.

When a TN mode liquid crystal display is in non-driven state, i.e., when no driving voltage is applied to the electrode, the liquid crystal molecules 9 in the liquid crystal cell are aligned substantially parallel to the surface of the substrate. The liquid crystal layer has a twisted structure of the liquid crystal. That is, the liquid crystal molecules are twisted at an angle (a twist angle) of 90° between the upper and lower substrates. As the applied voltage rises, the liquid crystal molecules are gradually positioned perpendicular to the surface of the substrate while eliminating their twist. In the related art TN mode liquid crystal display, when the liquid crystal molecules are substantially no longer twisted and are positioned substantially perpendicular to the surface of the substrate, it is considered to perform black display. In other words, when display is switched from white to black, the alignment of the liquid crystal molecules to the surface of the substrate changes from substantially parallel to substantially perpendicular. The magnitude of change causes the occurrence of brightness inversion. In IPS mode, in which no brightness inversion occurs, the liquid crystal molecules are aligned parallel to the surface of the substrate in both the cases of white display and black display. It is reported that in TN mode, too, brightness inversion resistance can be improved by reducing the change of the direction of alignment of the liquid crystal molecules to the surface of the substrate from white display to black display (TECHNICAL REPORT OF IEICE, EID2001-108, pp. 47-52).

When a TN mode liquid crystal display is in non-driven state, i.e., when no driving voltage is applied to the electrode, the liquid crystal molecules 11 in the liquid crystal cell are aligned substantially parallel to the surface of the substrate. The liquid crystal molecules are twisted at an angle of 90° between the upper and lower substrates. As the applied voltage rises, the liquid crystal molecules are gradually positioned perpendicular to the surface of the substrate while eliminating their twist. In a TN mode liquid crystal display in an ideal high voltage-applied state, when the liquid crystal molecules are substantially no longer twisted and positioned substantially perpendicular to the surface of the substrate, it is considered to perform black display. However, in the related art TN mode liquid crystal display, no ideal high voltage can be applied, making it impossible for the liquid crystal molecules to be positioned completely perpendicular to the surface of the substrate and leaving some of the liquid crystal molecules twisted. In the related art TN mode liquid crystal display, this state is regarded as black display. Under these conditions, the liquid crystal layer has some phase difference left uneliminated therein, causing the reduction of front contrast from the ideal value in particular. In accordance with the invention, the front contrast ratio can be raised by compensating the residual phase difference at the same black voltage as the related art. Further, by compensating the residual phase difference at a lower voltage than the related art, the front contrast can be raised and brightness inversion resistance can be improved.

In the invention, the state in which the liquid crystal molecules are not completely positioned perpendicular to the surface of the substrate and some of the liquid crystal molecules are left twisted at a lower voltage than the related art is regarded as black display, making it possible to remarkably improve brightness inversion resistance.

Let us suppose that the white voltage and black voltage of the liquid crystal display (i.e., the applied voltage to provide the white display state of the liquid crystal display and the applied voltage to provide the black display state of the liquid crystal display) are Vw and Vb, respectively and the front white display transmittance of the liquid crystal display (i.e., a transmittance from an anterior view in the white display state) and front black display transmittance of the liquid crystal display (i.e., a transmittance from an anterior view in the black display state) shown in FIG. 1 from which all the optical compensation films (3, 5, 12, 14) have been removed leaving the other constitutions unchanged are T2(Vw) and T2(Vb), respectively. The voltage Vb applied to the liquid crystal display is adjusted during black display such that the transmittance ratio T2(Vw):T2(Vb) is 100:1 or less. In this manner, the resistance to downward brightness inversion can be remarkably improved. When the voltage Vb is adjusted such that the transmittance ratio T2(Vw):T2(Vb) is 100:1 or more, the region within which no downward brightness inversion occurs is 45° or less, demonstrating that the resulting improvement is reduced.

The representation of white display transmittance and black display transmittance are not specifically limited so far as these transmittances are used within the visible light range, but brightness is normally used.

The display mode of the liquid crystal display to be used in the invention is not specifically limited, but TN mode, OCB mode and ECB mode are preferably used. In the invention, the product Δn·d of the thickness d (μm) of the liquid crystal layer and the refractive index anisotropy Δn is defined to fall within the range of from 0.2 to 1.2 μm. The optimum value of Δn·d differs from display mode to display mode. The optimum Δn·d value of a liquid crystal in TN mode is from 0.2 to 0.5 μm. In OCB mode, the optimum Δn·d value is from 0.4 to 1.2 μm. The optimum twist angle of the liquid crystal layer in TN mode is in the vicinity of 90° (from 85° to 95°). Within these ranges, the white display brightness is high and the black display brightness is low, making it possible to obtain a display device which gives a bright image with a high contrast.

These optimum values are those in transmissive mode. In the reflective mode, the liquid crystal cell has as many light paths as twice that in the transmissive mode. Thus, the optimum Δn·d value is about half the aforementioned value. The optimum twist angle is from 30° to 70°.

The liquid crystal display to be used in the invention not only is for the aforementioned display modes but also may be used in an embodiment suitable for VA mode, ECB mode, IPS mode or STN mode.

The liquid crystal display of the invention is not limited to the configuration shown in FIG. 1 but may comprise other members. For example, a color filter may be provided interposed between the liquid crystal cell and the polarizing film. In the case where the liquid crystal display of the invention is used as a transmissive mode liquid crystal display, a backlight comprising a cold or hot cathode fluorescent tube, light-emitting diode, field emission element or electroluminescent element as a light source may be provided on the back surface of the device. The liquid crystal display of the invention may be of reflective type. In this case, only one sheet of polarizing plate may be provided on the observation side. A reflective film is provided on the back surface of the liquid crystal cell or on the inner surface of the lower substrate of the liquid cell. It goes without saying that a front light comprising the aforementioned light source may be provided on the observation side of the liquid crystal cell. The liquid crystal display of the invention may be of semi-transmissive mode comprising a reflective region and a transmissive region per pixel in the display device to attain both the transmissive and reflective modes.

The liquid crystal display of the invention may be of direct image viewing type, image projecting type or optical modulation type. A particularly effective embodiment of the liquid crystal display of the invention is an active matrix liquid crystal display comprising a three-terminal or two-terminal semiconductor element such as TFT and MIM. It goes without saying that another effective embodiment of the liquid crystal display is a passive matrix liquid crystal display such as STN mode liquid crystal display called time-divided drive system.

The operation of the liquid crystal display shown in FIG. 1 will be described with reference to TN mode by way of example. The present embodiment will be described with reference to the case where active drive is effected using a nematic liquid crystal having a positive dielectric anisotropy as a field effect type liquid crystal.

In TN mode, a liquid crystal having a positive dielectric anisotropy, a refractive index anisotropy $\Delta n$ of 0.0854 (589 nm at 20° C.) and a dielectric constant anisotropy of $\Delta \in$ of about +8.5 is rubbing-aligned between the upper and lower substrates 7 and 10 to prepare a liquid crystal cell. The alignment of the liquid crystal layer is controlled by the alignment layer and rubbing. The director indicating the alignment of the liquid crystal molecules, i.e., so-called tilt angle is preferably about 3°. The rubbing direction is perpendicular to the upper and lower substrates. The magnitude of tilt angle can be controlled by the intensity of rubbing and the number of rubbings. The alignment layer is formed by spreading a polyimide, and then calcining the spread. The magnitude of twist angle of the liquid crystal layer is determined by the crossing angle of rubbing direction of the upper and lower substrates and the kind of chiral agent incorporated in the liquid crystal material. In the present embodiment, a chiral agent having a pitch of about 60 µm is incorporated in the liquid crystal material so that the twist angle of the liquid crystal layer is 90°. The thickness d of the liquid crystal layer is predetermined to 5 µm.

The liquid crystal material LC is specifically limited so far as it is a nematic liquid crystal. The greater the dielectric constant anisotropy $\Delta \in$ is, the more can be reduced the driving voltage. The smaller the refractive index anisotropy $\Delta n$ is, the greater can be the thickness (gap) of the liquid crystal layer, the less can be the filling time of liquid crystal and the dispersion of gap. Further, the greater $\Delta n$ is, the smaller is the cell gap and the higher is the responce.

The lamination of the various layers is made in such an arrangement that the absorption axis 2 of the upper polarizing plate 1 and the absorption axis 17 of the lower polarizing plate 16 cross each other at substantially right angle, the absorption axis 2 of the upper polarizing plate 1 of the liquid crystal cell and the rubbing direction 8 of the upper polarizing plate 7 of the liquid crystal cell are positioned substantially parallel to each other and the absorption axis 17 of the lower polarizing plate 16 and the rubbing direction 11 of the lower substrate 10 are positioned substantially parallel to each other. A transparent electrode (not shown) is formed on the inner surface of the alignment layer of the upper substrate 7 and the lower substrate 10. When the liquid crystal display is in a non-driven state, that is, no driving voltage is applied to the electrode, the liquid crystal molecules 9 in the liquid crystal cell are aligned substantially parallel to the surface of the substrate. As a result, the polarization of light passing through the liquid crystal panel propagates along the twisted structure of the liquid crystal molecules. The polarizing director rotates by 90° on the surface of the polarizing plate to emit light. In other words, the liquid crystal display performs white display in a non-driven state. On the other hand, when the liquid crystal display is in a driven state, the liquid crystal molecules are aligned at a certain angle with respect to the surface of the substrate. When the light which has passed through the lower polarizing plate 16 passes through the optical compensation films 14, 12, 5 and 3, retardation caused by the liquid crystal layer, etc. is eliminated. Thus, the light passes through the liquid crystal layer 9 while being polarized, and is then blocked by the polarizing plate 1. To be short, the liquid crystal display can perform ideal black display in a driven state.

(Optical Compensation Film)

In the liquid crystal display of FIG. 1, the laminate of the upper first optical anisotropic layer 5 and the upper second optical anisotropic layer 3 (provided on the transparent support) and the layered product of the lower first optical anisotropic layer 12 and the lower second optical anisotropic layer 14 (provided on the transparent support) act as an optical compensation film.

An optical compensation film is used in various liquid crystal displays to eliminate image discoloration or enhance the viewing angle. As such an optical compensation film there has heretofore been used a stretched birefringent polymer film. When provided with birefringence, the protective film for the polarizing plate acts also as an optical compensation film. An optical compensation film comprising an optical anisotropic layer made of a low or high molecular liquid crystalline compound formed on a transparent support, which substitutes for the optical compensation film made of stretched birefringent polymer film, can realize optical properties that are impossible by the related art stretched birefringent polymer film because liquid crystalline compounds can be aligned in various forms. The liquid crystalline compounds can be classified into two types, i.e., rod-shaped and discotic by their shape. The liquid crystalline compounds can also be classified as low or high molecular type.

Let us suppose that the white display transmittance and the black display transmittance of the liquid crystal display having the optical compensation film of the invention incorporated therein are T1(Vw) and T1(Vb), respectively. The optical compensation film is designed such that the ratio of front white display transmittance T1(Vw) to front black display transmittance T1(Vb), i.e., contrast ratio T1(Vw):T1(Vb) is 100:1 or more. The aforementioned contrast ratio preferably falls within the range of 200:1 or more, more preferably 300:1 or more. The optical compensation film is also designed such that the ratio of the maximum value of black display transmittance to T1(Vw) is 10% or less at an azimuth angle of 60° from the normal to the substrate (i.e., in all the directions of 60° from the normal to the substrate). The ratio of the maximum value of black display transmittance to T1(Vw) is preferably 5% or less at an azimuth angle of 60° from the normal to the substrate. In this arrangement, the liquid crystal cell can be compensated at the front and viewing angle, making it possible to realize a liquid crystal display having a wide viewing point angle which can give a high contrast image without causing brightness inversion.

Further, in order to accurately compensate a liquid crystal cell having many molecules left twisted, the liquid crystal display is designed such that when the optical compensation film is rotated on the direction normal to the surface of the optical compensation film as rotary axis with the optical compensation film disposed interposed between a pair of polarizing elements arranged in cross nicol configuration (the compensation film and the pair of polarizing elements provides a layered product), there is no direction in which quenching occurs. The transmittance at which no quenching occurs is preferably 0.01% or more. As the pair of polarizing elements there is preferably used ones having a transmittance of 0.001% or less when they are arranged in cross nicol configuration based on 100% of the transmittance when they are arranged in parallel nicol configuration. Examples of such a polarizing element include Glan-Thompson prism. When a polarizing element having a transmittance as great as 0.1% in cross nicol configuration is used, the measured transmittance is 0.1% or more even if any optical compensation film is disposed interposed between the polarizing elements, making it impossible to obtain the above defined minimum transmittance.

In order to obtain the same viewing point angle properties as that of CRT, the range over which the contrast is 10 or more is preferably an azimuth angle of 70° or more. When used in television or monitor for note personal computer or personal computer, the angle at which downward brightness inversion occurs is preferably 50° or more.

In the invention, when black display is performed, the TN mode liquid crystal display has many liquid crystal molecules twisted in alignment and thus has some retardation left uneliminated from an anterior view. The optical compensation film to be used in the invention optically compensates the residual retardation. In order to prepare an optical compensation film for performing more accurate compensation, an optical anisotropic layer made from liquid crystalline compound is formed on a transparent support in such an arrangement that the controlled alignment direction of the liquid crystalline compound on the side of the optical anisotropic layer in contact with the transparent support and the controlled alignment direction of the liquid crystalline compound on the side of the optical anisotropic layer opposed to the transparent support differ from each other. In this arrangement, the twisted components in the liquid crystal cell can be fairly compensated by the twisted components in the optical anisotropic layer.

Another approach is to form first and second optical anisotropic layers made from liquid crystalline compound on a transparent support in such an arrangement that the alignment of the liquid crystalline compound is controlled in different directions from the first optical anisotropic layer to the second optical anisotropic layer. In this arrangement, the twisted components in the liquid crystal cell can be fairly compensated.

As the liquid crystalline compound to be used in the optical anisotropic layer there is preferably used a discotic liquid crystalline compound. Further, an optical anisotropic layer may be further added to compensate the twist which cannot be completely compensated by the first optical anisotropic layer and the second optical anisotropic layer.

When black display is performed, the TN mode liquid crystal display according to the invention has some liquid crystal molecules left twisted and thus has some retardation left uneliminated from an anterior view. The optical compensation film to be used in the invention optically compensates the residual retardation. In order to prepare an optical compensation film for performing more accurate compensation, an optical anisotropic layer made from liquid crystalline compound is formed on a transparent support in such an arrangement that the controlled alignment direction of the liquid crystalline compound on the side of the optical anisotropic layer in contact with the transparent support and the controlled alignment direction of the liquid crystalline compound on the side of the optical anisotropic layer opposed to the transparent support differ from each other. In this arrangement, the twisted components in the liquid crystal cell can be fairly compensated by the twisted components in the optical anisotropic layer.

Alternatively, an optical anisotropic layer made from liquid crystalline compound is formed on a transparent support in such an arrangement that the average direction of alignment of major axis of molecules constituting the optical anisotropic layer can be controlled. In this arrangement, the twisted components in the liquid crystal cell can be fairly compensated similarly. As the liquid crystalline compound to be used in the optical anisotropic layer there is preferably used a discotic liquid crystalline compound. Further, the twist angle of the liquid crystal layer may be greater than 90 degrees.

The ratio of retardation Re(650) of the first optical anisotropic layer and the second optical anisotropic layer measured at 650 nm to retardation Re(450) of the first optical anisotropic layer and the second optical anisotropic layer measured at 450 nm $\{Re(650)\}/\{Re(450)\}$ is preferably from 0.8 to 1.2. When this ratio is predetermined to fall within the above defined range, the tint of the liquid crystal display can be remarkably improved.

The materials, production methods and other conditions of the various members which can be used in the liquid crystal display of the invention will be described in detail hereinafter.

(Retardation of Film)

Re retardation and Rth retardation of a film are defined by the following equations (I) and (II), respectively.

$$Re=(nx-ny)\times d \qquad \text{Equation (I)}$$

$$Rth=\{(nx+ny)/2-nz\}\times d \qquad \text{Equation (II)}$$

In Equations (I) and (II), nx indicates the refractive index of the film in the direction of a slow axis in a film plane (direction in which the refractive index reaches maximum). In Equations (I) and (II), ny indicates the refractive index of the film in the direction of a fast axis in the film plane (direction in which the refractive index reaches minimum). In Equation (II), nz indicates the refractive index of the film in the thickness direction (i.e., a direction normal to the film plane). In Equations (I) and (II), d indicates the thickness of the film in terms of nm.

(Support)

The support for use in the alignment of the liquid crystalline compound and the transparent support for the optical compensation film to be produced may differ from each other. For example, an optical anisotropic layer obtained by fixing a liquid crystalline compound in a certain alignment according to the invention can be transferred onto a transparent support to produce an optical compensation film. In the case where the support for use in the alignment of the liquid crystalline compound and the transparent support for the optical compensation film differ from each other, the support for use in the alignment of the liquid crystalline compound is not specifically limited.

The support of the invention is preferably glass or a transparent polymer film. The support preferably exhibits a light transmittance of 80% or more. Examples of the polymer constituting the polymer film include cellulose ester (e.g., mono- to tri-acylated cellulose), norbornene-based polymer, and polymethyl methacrylate. Alternatively, commercially available polymers (e.g., ARTON and ZEONEX, trade name of norbornene-based polymer) may be used. Further, even known polymers which can easily exhibit birefringence such as polycarbonate and polysulfone can be used as optical film of the invention when the exhibition of birefringence is controlled by modifying their molecules as described in WO'00/26705.

Preferred among these polymers is cellulose ester, particularly lower aliphatic acid ester of cellulose. The term "lower aliphatic acid" as used herein is meant to indicate an aliphatic acid having 6 or less carbon atoms. A cellulose acylate having from 2 to 4 carbon atoms is particularly preferred. Cellulose acetate is particularly preferred. A mixed aliphatic acid ester such as cellulose acetate propionate and cellulose acetate butyrate may be used.

The viscosity-average polymerization degree of the cellulose acetate is preferably 250 or more, more preferably 290 or more. The distribution of molecular weight Mw/Mn (Mw: weight-average molecular weight; Mn: number-average molecular weight) of the cellulose acetate by gel permeation chromatography is preferably sharp. In some detail, Mw/Mn is preferably from 1.0 to 1.7, more preferably from 1.0 to 1.65.

The polymer film is preferably made of a cellulose acetate having an acetylation degree of from 55.0 to 62.5. The acetylation degree of the cellulose acetate is more preferably from 57.0 to 62.0. The term "acetylation degree" as used herein is meant to indicate the amount of bonded acetic acid per unit weight of cellulose. The acetylation degree is determined by the method of measuring and calculating acetylation degree according to ASTM:D817-91 (testing method on cellulose acetate, etc.).

In cellulose acetate, hydroxyl at 2-, 3- and 6-positions in cellulose are not uniformly substituted. The degree of substitution on 6-position tends to drop. In the polymer film to be used in the invention, the degree of substitution on 6-position in cellulose is preferably greater than that on 2- and 3-positions. The proportion of the degree of substitution on 6-position in the total degree of substitution on 2-, 3- and 6-positions is preferably from 30% to 40%, more preferably from 31% to 40%, most preferably from 32% to 40%. The degree of substitution on 6-position is preferably 0.88 or more.

For the details of method for the synthesis of acyl group and cellulose acylate, reference can be made to Kokai Giho No. 2001-1745, Japan Institute of Invention and Innovation, Mar. 15, 2001, page 9.

The polymer film, if used in the optical compensation film, preferably has a desired retardation value. Re retardation and Rth retardation of a film are defined by the following equations (I') and (II'), respectively.

$$Re = |nx - ny| \times d \quad \text{Equation (I')}$$

$$Rth = \{(nx + ny)/2 - nz\} \times d \quad \text{Equation (II')}$$

In Equations (I') and (II'), nx indicates the refractive index of the film in the direction of a slow axis in a film plane (direction in which the refractive index reaches maximum), ny indicates the refractive index of the film in the direction of a fast axis in the film plane (direction in which the refractive index reaches minimum), nz indicates the refractive index of the film in the thickness direction, and d indicates the thickness of the film in terms of nm.

The preferred range of retardation value of a polymer film depends on the liquid crystal cell used with the optical compensation film and the usage of the liquid crystal cell. Re retardation is preferably adjusted to a range of from 0 to 200 nm and Rth retardation is preferably adjusted to a range of from 10 to 400 nm.

In the case where the liquid crystal display comprises two optical anisotropic layers, Rth retardation of the polymer film is preferably from 10 nm to 250 nm. In the case where the liquid crystal display comprises one optical anisotropic layer, Rth retardation of the substrate is preferably from 150 nm to 400 nm.

The birefringence (Δn: nx−ny) of the substrate film is preferably from 0.00028 to 0.020. The birefringence of the cellulose acetate film in the thickness direction {(nx+ny)/2−nz} is preferably from 0.001 to 0.04.

In order to adjust the retardation of a polymer film, it is usually practiced to apply an external force such as stretching force to the polymer film. Alternatively, a retardation increasing agent for adjusting the optical anisotropy is optionally incorporated in the polymer film. In order to adjust the retardation of cellulose acylate film, an aromatic compound having at least two aromatic rings is preferably used as a retardation increasing agent. The aromatic compound is preferably used in an amount of from 0.01 to 20 parts by weight based on 100 parts by weight of cellulose acylate. Two or more such aromatic compounds may be used in combination. The aromatic rings in the aromatic compound include aromatic heterocyclic groups besides aromatic hydrocarbon rings. Examples of these aromatic compounds include those disclosed in EP0911656A2, JP-A-2000-111914, and JP-A-2000-275434.

It is further preferred that the moisture expansion coefficient of the cellulose acetate film to be used in the optical compensation film of the invention be $30 \times 10^{-5}$/% RH or less. The moisture expansion coefficient of the cellulose acetate film is preferably $15 \times 10^{-5}$/% RH or less, more preferably $10 \times 10^{-5}$/% RH or less. The moisture expansion coefficient of the cellulose acetate film is preferably small but is normally $1.0 \times 10^{-5}$/% RH or more.

The moisture expansion coefficient indicates the change of the length of the sample after change of relative humidity at a constant temperature. By properly adjusting the moisture expansion coefficient, the frame-shaped rise of transmittance (leakage of light due to strain) can be prevented while keeping the optical compensation film capable of performing optical compensation.

The method for the measurement of moisture expansion coefficient will be described hereinafter. A specimen having a size of 5 mm width and 20 mm length was cut out of a polymer film prepared. The specimen was hanged in an atmosphere of 25° C. and 20% RH(R0) with one end thereof fixed. A 0.5 g weight was hanged from the other end of the specimen. The specimen was then allowed to stand for 10 minutes. The length (L0) of the specimen was measured. Subsequently, the specimen was measured for length (L1) at the temperature kept at 25° C. and a humidity of 80% RH(R1). The moisture expansion coefficient of the specimen was then calculated by the following equation. Measurement was made on 10 samples for each specimen. The measurements were then averaged.

$$\text{Moisture expansion coefficient (/\% RH)} = \{(L1-L0)/L0\}/(R1-R0)$$

In order to reduce the dimensional change of the polymer film due to moisture, it is preferred that the polymer film comprise a compound or particulate material having a hydrophobic group incorporated therein. As such a compound having a hydrophobic group there is particularly preferably used a material corresponding to plasticizer or deterioration inhibitor having a hydrophobic group such as aliphatic group and aromatic group in molecule. The amount of such a compound to be incorporated in the polymer film is preferably from 0.01 to 10% by weight based on the weight of the solution (dope) to be prepared. The free volume in the polymer film is preferably reduced. In some detail, the less the amount of residual solvent during the film forming by the solvent casting method described later is, the less is the free volume in the polymer film. The polymer film is preferably dried under the conditions that the amount of residual solvent based on the weight of the cellulose acetate film is from 0.01% to 1.00% by weight.

The aforementioned additives to be incorporated in the polymer film or additives which can be incorporated in the polymer film depending on various purposes (e.g., ultraviolet inhibitor, release agent, antistatic agent, deterioration inhibitor (e.g., oxidation inhibitor, peroxide decomposer, radical inhibitor, metal deactivator, acid scavenger, amine), infrared absorber) may be in a solid form or oily form. In the case where the film is composed of a number of layers, the kind and added amount of additives in the various layers may be different. For the details of these materials, reference can be made to the above cited Kokai Giho No. 2001-1745, pp. 16-22. Referring to the amount of these additives to be used, the added amount of the various materials is not specifically limited so far as the desired performance can be exhibited, but these materials are each incorporated in an amount of from 0.001 to 25% by weight based on the total compositions of the polymer film.

(Method for the Production of Polymer Film)

The production of the polymer film is preferably accomplished by the solvent casting method. In the solvent casting method, a solution (dope) having a polymer material dissolved in an organic solvent is used to produce a film.

The dope is casted over a drum or band. The solvent is then evaporated from the dope to form a film. Before casted, the dope is preferably adjusted to have a solid content of from 18% to 35%. The surface of the drum or band is preferably mirror-finished.

The dope is preferably casted over a drum the surface temperature of which is 10° C. or less. The dope thus casted is preferably dried with air for 2 seconds or more. The film thus obtained is then peeled off the drum or band. The film may be optionally dried with hot air the temperature of which varies successively from 100° C. to 160° C. to evaporate residual solvent. The aforementioned method is described in JP-B-5-17844. In accordance with this method, the time between casting and peeling can be reduced. In order to effect this method, it is necessary that the dope be gelated at the surface temperature of the drum or band during casting.

At the casting step, one cellulose acylate solution may be casted in a single layer or two or more cellulose acylate solutions may be co-casted simultaneously or successively.

Examples of the aforementioned method for co-casting two or more cellulose acylate solutions include a method which comprises casting a solution containing cellulose acylate through a plurality of casting ports disposed apart from each other along the running direction of the support to make lamination (as disclosed in JP-A-11-198285), a method which comprises casting a cellulose acylate solution through two casting ports (as disclosed in JP-A-6-134933), and a method which comprises extruding simultaneously a high viscosity cellulose acylate solution and a low viscosity cellulose acylate solution with the flow of the high viscosity cellulose acylate solution wrapped in the low viscosity cellulose acylate solution (as disclosed in JP-A-56-162617). The invention is not limited to these methods.

For the details of these production methods involving solvent casting, reference can be made to the above cited Kokai Giho No. 2001-1745, pp. 22-30. The solvent casting method involves steps of dissolution, casting (including co-casting), drying, peeling, stretching, etc.

The thickness of the film of the invention is preferably from 15 μm to 120 μm, more preferably from 30 μm to 80 μm.

(Surface Treatment of Polymer Film)

The polymer film is preferably subjected to surface treatment. Examples of surface treatment include corona discharge treatment, glow discharge treatment, flame treating, acid treatment, alkali treatment, and irradiation with ultraviolet ray. For the details of these surface treatment methods, reference can be made to the above cited Kokai Giho No. 2001-1745, pp. 30-32. Particularly preferred among these surface treatment methods is alkaline saponification, which is extremely effective for the surface treatment of cellulose acylate film.

Alkaline saponification may be carried out by dipping the polymer film in a saponifying solution or spreading a saponifying solution over the polymer film. The coating method is preferred. Examples of the coating method include dip coating method, curtain coating method, extrusion coating method, bar coating method, and E type coating method. Examples of the alkaline saponifying solution include solution of potassium hydroxide, and solution of sodium hydroxide. The specified concentration of hydroxide ion is preferably from 0.1 to 3.0 N. As an alkaline treatment solution, the alkaline saponifying solution may comprise a solvent having good wetting properties (e.g., isopropyl alcohol, n-butanol, methanol, ethanol), a surface active agent and a wetting agent (e.g., diol, glycerin) incorporated therein to exhibit better wetting properties with respect to the transparent support and age stability. For details, reference can be made to JP-A-2002-82226 and WO02/46809.

The surface treatment may be replaced by a single-layer coating method involving the spreading of only one subbing layer (as disclosed in JP-A-7-333433) or resin layer made of gelatin containing both hydrophobic group and hydrophilic group in addition to surface treatment or a multi-layer coating method (as disclosed in JP-A-11-248940) involving the provision of a layer having a good adhesion to polymer film (hereinafter referred to as "first subbing layer") as a first layer and the subsequent spreading of a hydrophilic resin layer made of gelatin having a good adhesion to alignment layer (hereinafter referred to as "second subbing layer") as a second layer.

(Optical Anisotropic Layer)

A preferred embodiment of implementation of the optical anisotropic layer made of liquid crystalline compound will be described in detail hereinafter.

The optical anisotropic layer is preferably designed so as to compensate the liquid crystal compound in the liquid crystal cell when the liquid crystal display performs black display. The alignment of the liquid crystal compound in the liquid crystal cell during black display depends on the mode of the liquid crystal display. For the details of the alignment of the liquid crystal compound in the liquid crystal cell, reference can be made to IDW' 00, FMC7-2, pp. 411-414.

An alignment layer is preferably provided interposed between the polymer substrate thus surface-treated and the optical anisotropic layer provided thereon.

(Alignment Layer)

The alignment layer acts to define the direction of alignment of the liquid crystal molecules. Accordingly, the alignment layer is essential for the realization of the preferred embodiment of implementation of the present invention. However, when the liquid crystalline compound is fixed aligned, the alignment layer is not necessarily essential as a constituent of the invention because the liquid crystalline compound is already aligned. In other words, the polarizing plate can be produced by transferring only the optical anisotropic layer on the alignment layer having fixed alignment onto the polarizing element.

The alignment layer can be provided by the rubbing of an organic compound (preferably polymer), the oblique vacuum deposition of an inorganic compound, the formation of a layer having a microgroove or the accumulation of an organic compound (e.g., ω-tricosanoic acid, dioctadecylmethyl ammonium chloride, methyl stearate) by Langmuir-Blodgett method (LB film). Further, an alignment layer which acts to perform alignment when given an electric or magnetic field or irradiated with light is known.

The alignment layer is preferably formed by the rubbing of a polymer. In principle, the polymer to be used in the alignment layer has a molecular structure capable of aligning the liquid crystal molecules.

In the invention, in addition to alignment of the liquid crystal molecules, it is preferably practiced to bond a side chain having a crosslinking functional group (e.g., double bond) to the main chain or introduce a crosslinking functional group capable of aligning the liquid crystal molecules in the side chains.

As the polymer to be used in the alignment layer there may be used a polymer which is crosslinkable itself or a polymer which can be crosslinked by a crosslinking agent. A plurality of combinations of these polymers may be used.

Examples of the polymer employable herein include methacrylate-based copolymers, styrene-based copolymers, polyolefins, polyvinyl alcohols, modified polyvinyl alcohols, poly(N-methylolacryamide), polyesters, polyimides, vinyl acetate copolymers, carboxymethyl cellulose and polycarbonates described in JP-A-8-338913, paragraph (0022). A silane coupling agent may be used as a polymer. Water-soluble polymers (e.g., poly(N-methylolacrylamide), carboxymethyl cellulose, gelatin, polyvinyl alcohol, modified polyvinyl alcohol) are preferred. More desirable among these polymers are gelatin, polyvinyl alcohol, and modified polyvinyl alcohol. Most desirable among these polymers are polyvinyl alcohol and modified polyvinyl alcohol. It is particularly preferred that two polyvinyl alcohols or modified polyvinyl alcohols having different polymerization degrees be used in combination.

The saponification degree of the polyvinyl alcohol is preferably from 70% to 100%, more preferably from 80% to 100%. The polymerization degree of the polyvinyl alcohol is preferably from 100 to 5,000.

The side chain capable of aligning the liquid crystal molecules normally has a hydrophobic group as a functional group. In some detail, the kind of the functional group is determined by the kind and desired alignment of the liquid crystal molecules.

For example, the introduction of modifying group in the polyvinyl alcohol is accomplished by copolymerization modification, chain transfer modification or block polymerization modification. Examples of the modifying group include hydrophilic groups (e.g., carboxylic acid group, sulfonic acid group, phosphonic acid group, amino group, ammonium group, amide group, thiol group), hydrocarbon groups having from 10 to 100 carbon atoms, fluorine-substituted hydrocarbon groups, thioether groups, polymerizable groups (e.g., unsaturated polymerizable group, epoxy group, azirinidyl group), and alkoxysilyl groups (trialkoxy, dialkoxy, monoalkoxy). Specific examples of these modified polyvinyl alcohol compounds include those described in JP-A-2000-155216, paragraphs (0022)-(0145) and JP-A-2002-62426, paragraphs (0018)-(0022).

When a side having a crosslinking functional group is bonded to the main chain of the alignment layer polymer or a crosslinking functional group is introduced into side chains capable of aligning the liquid crystal molecules, the polymer of the alignment layer and the polyfunctional monomer contained in the optical anisotropic layer can be copolymerized with each other. As a result, not only the polyfunctional monomers are firmly covalently bonded to each other but also the alignment layer polymers are firmly covalently bonded to each other or the polyfunctional monomer and the alignment layer polymer are firmly covalently bonded to each other.

Accordingly, by introducing a crosslinking functional group into the alignment layer polymer, the strength of the optical compensation film can be remarkably enhanced.

The crosslinking functional group in the alignment layer polymer preferably contains a polymerizable group similarly to the polyfunctional monomer. Specific examples of the polymerizable group include those described in JP-A-2000-155216, paragraphs (0080)-(0100).

The alignment layer may be also crosslinked with a crosslinking agent separately of the aforementioned functional group. Examples of the crosslinking agent employable herein include aldehyde, N-methylol compound, dioxane derivative, compound which acts upon deactivation of carboxyl group, activated vinyl compound, activated halogen compound, isooxazole, and dialdehyde starch. Two or more crosslinking agents may be used in combination. Specific examples of the crosslinking agent employable herein include compounds described in JP-A-2002-62426, paragraphs (0023)-(0024). An aldehyde, particularly glutaraldehyde, having a high reaction activity is preferred.

The added amount of the crosslinking agent is preferably from 0.1 to 20% by weight, more preferably from 0.5 to 15% by weight based on the weight of the polymer. The amount of the crosslinking agent left behind in the alignment layer is preferably 1.0% by weight or less, more preferably 0.5% by weight or less. In this arrangement, the alignment layer can be provided with a sufficient durability free from reticulation even after a prolonged use in the liquid crystal display or a prolonged storage in an atmosphere of high temperature and humidity.

The alignment layer can be essentially formed by spreading a solution containing the aforementioned polymer and crosslinking agent which are constituents of the alignment layer over a transparent support, heat-drying (crosslinking) the coat layer, and then subjecting the coat to rubbing. The crosslinking reaction may be effected during any time after the spreading of the alignment layer constituting material as previously mentioned. In the case where a water-soluble polymer such as polyvinyl alcohol is used as an alignment layer constituting material, the coating solution is preferably a solution in a mixture of an organic solvent having antifoaming action (e.g., methanol) and water. The mixing ratio of water and methanol by weight is preferably from 0:100 to 99:1, more preferably from 0:100 to 91:9. In this arrangement, the occurrence of bubbles can be inhibited, making it possible to remarkably reduce the occurrence of defects on the surface of the alignment layer, even the optical anisotropic layer.

The spreading of the alignment layer is preferably accomplished by spin coating method, dip coating method, curtain coating method, extrusion coating method, rod coating method or roll coating method. Particularly preferred among these coating methods is rod coating method. The dried thickness of the alignment layer is preferably from 0.1 μm to 10 μm. The heat drying may be effected at a temperature of from 20° C. to 110° C. In order to form a sufficient crosslink, the heat drying temperature is preferably from 60° C. to 100° C., particularly from 80° C. to 100° C. The drying time is from 1 minute to 36 hours, preferably from 1 minute to 30 minutes. The pH value of the coating solution is preferably predetermined to a value most suitable for the crosslinking agent used. In the case where glutaraldehyde is used, the pH value of the coating compound is preferably from 4.5 to 5.5, particularly 5.

The alignment layer is provided on the transparent support or the aforementioned subbing layer. The alignment layer can be obtained by crosslinking the polymer layer as mentioned above, and then subjecting the surface of the polymer layer thus crosslinked to rubbing.

As the rubbing treatment there may be used a treatment method which is widely used as a step of aligning liquid crystal in LCD. In some detail, the surface of the alignment layer is rubbed with paper, gauze, felt, rubber or nylon or polyester fiber in a predetermined direction to attain alignment. In general, rubbing is effected several times using a cloth obtained by uniformly weaving fibers having a uniform length and thickness.

Subsequently, the alignment layer is allowed to act to align the liquid crystal molecules in the optical anisotropic layer provided on the alignment layer. Thereafter, if necessary, the polymer in the alignment layer and the polyfunctional monomer contained in the optical anisotropic layer are reacted with each other or the polymer in the alignment layer is crosslinked with a crosslinking agent.

The thickness of the alignment layer is preferably from 0.1 μm to 10 μm.

The liquid crystal molecules to be used in the optical anisotropic layer include rod-shaped liquid crystalline molecules and discotic liquid crystalline molecules. The rod-shaped liquid crystalline molecules and discotic liquid crystalline molecules may be a low or high molecular liquid crystal molecules. Non-liquid crystal materials obtained by crosslinking low molecular liquid crystal molecules.

(Rod-Shaped Liquid Crystal Molecule)

As the rod-shaped liquid crystalline molecule there is preferably used azomethine, azoxy, cyanobiphenyl, cyaophenylester, benzoic acid ester, cyclohexanecarboxylic acid phenylester, cyanophenyl cyclohexane, cyano-substituted phenylpyrimidine, alkoxy-substituted phenylpyrimidine, phenyldioxane, tolan or alkenylcyclohexylbenzonitrile.

The rod-shaped liquid crystalline molecules include a metal complex. A liquid crystal polymer containing rod-shaped liquid crystalline molecules in repeating units may be used as rod-shaped liquid crystalline molecule. In other words, the rod-shaped liquid crystalline molecules may be bonded to (liquid crystal) polymer.

For the details of the rod-shaped liquid crystalline molecules, reference can be made to "Ekisho no Kagaku (Chemistry of Liquid Crystals)", vol. 22 of Survey of Chemistry, Quarterly, 1994, compiled by The Chemistry Society of Japan, Chapters 4, 7 and 11 and "Ekisho Debaisu Handobukku (Handbook of Liquid crystal displays)", 142nd Committee of JAPAN SOCIETY FOR THE PROMOTION OF SCIENCE, Chapter 3.

The birefringence of the rod-shaped liquid crystalline molecules preferably falls within the range of from 0.001 to 0.7. The rod-shaped liquid crystalline molecules preferably have a polymerizable group to fix its alignment. The polymerizable group is preferably a radical-polymerizable unsaturated group or cationically polymerizable group. Specific examples of the polymerizable group include polymerizable groups and polymerizable liquid crystal compounds as described in JP-A-2002-62427, paragraphs (0064)-(0086).

(Discotic Liquid Crystalline Molecule)

Examples of the discotic (discotic) liquid crystal molecule include benzene derivatives disclosed in study report from C. Destrade et al, "Mol. Cryst.", vol. 71, page 111, 1981, torxene derivatives disclosed in study report from C. Destrade et al, "Mol. Cryst.", vol. 122, page 141, 1985, and "Physc Lett", A, vol. 78, page 82, 1990, cyclohexane derivatives disclosed in study report from B. Kohne et al, "Angew. Chem.", vol. 96, page 70, 1984, and azacrown-based and phenylacetylene-based macrocycles disclosed in study report from J. M. Lehn et al, "J. Chem. Commun.", page 1794, 1985, and study report from J. Zhang et al, "J. Am. Chem. Soc.", vol. 116, page 2655, 1994.

Examples of the discotic liquid crystalline molecules include liquid crystalline compounds having a straight-chain alkyl group, alkoxy group or substituted benzoyloxy group radially substituted on the mother nucleus at the center of the molecule as side chain of the mother nucleus. These compounds preferably have molecules or molecular aggregates which are disposed rotation-symmetrically to give predetermined alignment. The compound which is finally contained in the optical anisotropic layer formed by the discotic liquid crystalline molecules does not need to be a discotic liquid crystalline molecule. For example, the compound contained in the optical anisotropic layer may be a low molecular discotic liquid crystalline molecule having a group which reacts when heated or irradiated with light, resulting in the polymerization or crosslinking that leads to conversion to higher polymer having no liquid crystal properties. Preferred examples of the discotic liquid crystalline molecules include those disclosed in JP-A-8-50206. For the details of polymerization of discotic liquid crystalline molecules, reference can be made to JP-A-8-27284.

In order to fix the discotic liquid crystalline molecules by polymerization, it is necessary that a polymerizable group be connected to the discotic core of the discotic liquid crystalline molecules as a substituent. The discotic core and the polymerizable group are preferably compounds which can be connected to each other via connecting group. In this arrangement, the discotic liquid crystalline molecules can be kept aligned even during polymerization reaction. Examples of these compounds include those disclosed in JP-A-2000-155216, paragraphs (0151)-(0168).

In hybrid alignment, the angle of the major axis (surface of disc) of the discotic liquid crystalline molecule with respect to the surface of the polarizing film increases or decreases with the rise of the distance from the surface of the polarizing film in the direction of depth of the optical anisotropic layer. The aforementioned angle preferably increases with the rise of the aforementioned distance. The change of the aforementioned angle may be in the form of continuous increase, continuous decrease, intermittent increase, intermittent decrease, mixture of continuous increase and continuous decrease or mixture of intermittent increase and intermittent decrease. The aforementioned angle may contain a region over which it shows no change so far as it generally increases or decreases. The aforementioned angle preferably changes continuously.

The average direction of the major axis of the discotic liquid crystalline molecules close to the polarizing film can be normally adjusted by properly selecting the material of the discotic liquid crystalline molecules or alignment layer or by selecting the rubbing method. The direction of the major axis (surface of disc) of the discotic liquid crystalline molecules close to the surface (air side) can be normally adjusted by properly selecting the kind of the discotic liquid crystalline molecules or the additives to be used with the discotic liquid crystalline molecules. Examples of the additives to be used with the discotic liquid crystalline molecules include plasticizers, surface active agents, polymerizable monomers, and polymers. The degree of change of the direction of alignment of the major axis of the discotic liquid crystalline molecules can be adjusted by properly selecting the liquid crystal molecules and the additives as in the aforementioned case.

(Other Compositions of Optical Anisotropic Layer)

The combined use of a plasticizer, a surface active agent, a polymerizable monomer, etc. with the aforementioned liquid crystal molecules makes it possible to enhance the uniformity of coat layer, the strength of layers, the alignment of liquid crystal molecules, etc. These compositions preferably have some compatibility with the liquid crystal molecules and are capable of giving a change of tilt angle of the liquid crystal molecules or do not inhibit the alignment of the liquid crystal molecules.

Examples of the polymerizable monomer employable herein include radical-polymerizable or cationically polymerizable compounds. Polyfunctional radical-polymerizable monomers are preferred. More preferably, these polyfunctional radical-polymerizable monomers are copolymerizable with the aforementioned liquid crystalline compound containing a polymerizable group. Examples of these polyfunctional monomers include those disclosed in JP-A-2002-296423, paragraphs (0018)-(0020). The added amount of the aforementioned compound is normally from 1 to 50% by weight, preferably from 5 to 30% by weight based on the weight of the discotic liquid crystalline molecules.

As the surface active agent there may be used a known compound, particularly a fluorine-based compound. Specific examples of the fluorine-based compound include those disclosed in JP-A-2001-330725, paragraphs (0028)-(0056).

The polymer to be used with the discotic liquid crystalline molecules preferably is capable of giving a change of tilt angle to the discotic liquid crystalline molecules.

Examples of the polymer employable herein include cellulose esters. Preferred examples of the cellulose esters include those disclosed in JP-A-2000-155216, paragraph (0178). In order to prevent the inhibition of the alignment of the liquid crystal molecules, the added amount of the aforementioned polymer is preferably from 0.1 to 10% by weight, more preferably from 0.1 to 8% by weight based on the weight of the liquid crystal molecules.

The discotic nematic liquid crystal phase-solid phase transition temperature of the discotic liquid crystalline molecules is preferably from 70° C. to 300° C., more preferably from 70° C. to 170° C.

(Formation of Optical Anisotropic Layer)

The optical anisotropic layer can be formed by spreading a coating solution containing liquid crystalline molecules and optionally a polymerization initiator and arbitrary components described later onto the alignment layer.

As the solvent to be used in the preparation of the coating solution there is preferably used an organic solvent. Examples of the organic solvent employable herein include amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), and ethers (e.g., tetrahydrofurane, 1,2-dimethoxyethane). Preferred among these organic solvents are alkyl halides and ketones. Two or more of these organic solvents may be used in combination.

The spreading of the coating solution is accomplished by any known method (e.g., wire bar coating method, extrusion coating method, direct gravure coating method, reverse gravure coating method, die coating method).

The thickness of the optical anisotropic layer is preferably from 0.1 µm to 20 µm, more preferably from 0.5 µm to 15 µm, most preferably from 1 µm to 10 µm.

(Fixing of Alignment of Liquid Crystalline Molecules)

The liquid crystalline molecules thus aligned can be fixed while being kept aligned. The fixing of alignment of the liquid crystalline molecules is preferably accomplished by polymerization reaction. Examples of the polymerization reaction employable herein include heat polymerization reaction involving the use of a heat polymerization initiator and photopolymerization reaction involving the use of a photopolymerization initiator. The photopolymerization reaction is preferably effected in the invention.

Examples of the photopolymerization initiator employable herein include α-carbonyl compounds (as disclosed in U.S. Pat. Nos. 2,367,661 and 2,367,670), acyloin ethers (as disclosed in U.S. Pat. No. 2,448,828), α-hydrocarbon substituted aromatic acyloin compounds (as disclosed in U.S. Pat. No. 2,722,512), polynuclear quinone compounds (as disclosed in U.S. Pat. Nos. 3,046,127 and 2,951,758), combinations of triarylimidazole dimer and p-aminophenylketone (as disclosed in U.S. Pat. No. 3,549,367), acridine and phenazine compounds (as disclosed in JP-A-60-105667 and U.S. Pat. No. 4,239,850), and oxadiazole compounds (as disclosed in U.S. Pat. No. 4,212,970).

The amount of the photopolymerization initiator to be used is preferably from 0.01 to 20% by weight, more preferably from 0.5 to 5% by weight based on the solid content of the coating solution.

As the light with which the liquid crystalline molecules are irradiated to cause polymerization there is preferably used ultraviolet ray.

The radiation energy is preferably from 20 mJ/cm$^2$ to 50 J/cm$^2$, more preferably from 20 mJ/cm$^2$ to 5,000 mJ/cm$^2$, even more preferably from 100 mJ/cm$^2$ to 800 mJ/cm$^2$. In order to accelerate photopolymerization reaction, irradiation with light may be effected under heating.

A protective layer may be provided on the optical anisotropic layer.

(Polarizing Film)

The optical film of the invention exhibits its performance remarkably when stacked with the polarizing plate or used as a protective film for the polarizing plate.

The optical anisotropic layer (the first optical anisotropic layer closest to the polarizing film in the case where a plurality of optical anisotropic layers are provided) is preferably formed on the polarizing from the liquid crystal molecules directly or via an alignment layer. In some detail, the aforementioned optical anisotropic layer coating solution is spread over the surface of the polarizing film to form an optical anisotropic layer. As a result, a thin polarizing plate which shows a small stress (strain×sectional area×elastic modulus) with the dimensional change of the polarizing film is formed without providing any polymer film between the polarizing film and the optical anisotropic layer. By attaching the polarizing plate according to the invention to a large-sized liquid crystal display, an image having a high quality can be displayed without causing problems such as light leakage.

The polarizing film is preferably a coat type polarizing film represented by products of Optiva Inc. or a polarizing film made of a binder and iodine or dichromatic dye.

Iodine and the dichromatic dye in the polarizing film exhibit polarizing properties when aligned in the binder. Iodine and the dichromatic dye are preferably aligned along the binder molecules. Alternatively, the dichromatic dye is preferably self-organized as in liquid crystal so that it is aligned in one direction.

At present, commercially available polarizing elements are normally prepared by dipping a stretched polymer in a solution of iodine or dichromatic dye in a bath so that iodine or the dichromatic dye penetrates the binder.

In commercially available polarizing films, iodine or a dichromatic dye is distributed over the depth of about 4 μm from the surface of the polymer (totaling about 8 μm on the both sides of the polymer). In order to obtain sufficient polarizing properties, the polarizing film needs to have a thickness of at least 10 μm. The degree of penetration of iodine or dichromatic die into the polymer can be controlled by the concentration of the solution of iodine or dichromatic die, the temperature of the bath and the dipping time.

As mentioned above, the lower limit of the thickness of the binder is preferably 10 μm. The upper limit of the thickness of the binder is preferably as small as possible from the standpoint of light leakage from the liquid crystal display. The thickness of the binder is preferably not greater than that of the polarizing plates which are now commercially available (about 30 μm), more preferably 25 μm or less, even more preferably 20 μm or less. When the thickness of the binder is 20 μm or less, no light leakage is observed in 17-inch liquid crystal displays.

The binder of the polarizing film may be crosslinked.

As the binder to be crosslinked there may be used a self-crosslinkable polymer. By allowing a polymer having a functional group as a binder or a binder obtained by introducing a functional group into a polymer to react with each other under irradiation with light, heating or pH change, a polarizing film can be formed.

A crosslinked structure may be introduced into the polymer by incorporating a crosslinking agent in the polymer. The crosslinking of the polymer is normally carried out by heating the coat layer obtained by spreading a coating solution containing a polymer or a mixture of a polymer and a crosslinking agent over a transparent support. The crosslinking step may be effected in any stage until the completion of the desired polarizing plate so far as the final product can be provided with desired durability.

As the binder for the polarizing film there may be used any of a self-crosslinkable polymer and a polymer which can be crosslinked with a crosslinking agent. Examples of the polymer employable herein include those listed with reference to the aforementioned alignment layer.

Most desirable examples of the polymer are polyvinyl alcohols and modified polyvinyl alcohols.

For the details of modified polyvinyl alcohols, reference can be made to JP-A-8-338913, JP-A-9-152509 and JP-A-9-316127. Two or more of these polyvinyl alcohols and modified polyvinyl alcohols may be used in combination.

The added amount of the crosslinking agent to be incorporated in the binder is preferably from 0.1 to 20% by weight based on the weight of the binder. In this arrangement, the alignment of the polarizing element and the moisture heat resistance of the polarizing film can be improved.

The alignment layer which has finished with crosslinking reaction contains some amount of the crosslinking agent left unreacted. However, the amount of residual crosslinking agent is preferably 1.0% by weight or less, more preferably 0.5% by weight or less based on the alignment layer. In this arrangement, even after a prolonged use or prolonged storage in a high temperature and humidity atmosphere in the form of assembly obtained by mounting the polarizing film on the liquid crystal display, no drop of polarization occurs.

For the details of crosslinking agents, reference can be made to US Reissued Pat. 23,297. Boron compounds (e.g., boric acid, borax) may be used as crosslinking agent.

As the dichromatic die there may be used an azo-based dye, stilbene-based dye, pyrazolone-based dye, triphenyl-methane-based dye, quinoline-based dye, oxazine-based dye, thiazine-based dye or anthraquinone-based dye. The dichromatic dye is preferably water-soluble. The dichromatic die preferably has hydrophilic substituents (e.g., sulfo, amino, hydroxyl).

Examples of the dichromatic die employable herein include those disclosed in Kokai Giho No. 2001-1745, Japan Institute of Invention and Innovation, Mar. 15, 2001, page 58.

In order to enhance the contrast ratio of the liquid crystal display, it is preferred that the polarizing plate exhibit as high transmittance as possible and as high polarization as possible. The transmittance of the polarizing plate is preferably from 30% to 50%, more preferably from 35% to 50%, most preferably from 40% to 50% at a wavelength of 550 nm. The polarization is preferably from 90% to 100%, more preferably from 95% to 100%, most preferably from 99% to 100% at a wavelength of 550 nm.

The polarizing film and the optical anisotropic layer or the polarizing film and the alignment layer may be disposed with an adhesive provided interposed therebetween. As the adhesive there may be used a polyvinyl alcohol-based resin (including polyvinyl alcohol modified with acetacetyl group, sulfonic acid group, carboxyl group or oxyalkylene group) or an aqueous solution of a boron compound. The polyvinyl alcohol-based resin is preferred. The thickness of the adhesive layer which has been dried is preferably from 0.01 μm to 10 μm, particularly from 0.05 μm to 5 μm.

(Production of Polarizing Plate)

From the standpoint of yield, the polarizing film is preferably stretched (stretching method) or rubbed (rubbing method) with the binder tilted at an angle of from 10 to 80 degrees with respect to the longitudinal direction (MD direction) of the polarizing film, and then dyed with iodine or a dichromatic die. The stretching of the polarizing film is preferably effected with the tilt angle coinciding with the angle of the transmission axis of two sheets of polarizing plates stuck to the respective side of the liquid crystal cell constituting LCD with respect to the longitudinal or crosswise direction of the liquid crystal cell.

The ordinary tilt angle is 45°. However, transmissive, reflective or semi-transmissive LCD's the tilt angle of which is not necessarily 45° have bee recently developed. The stretching direction can be preferably adjusted arbitrarily according to the design of LCD.

In the case of stretching method, the stretching factor is preferably from 2.5 to 30.0, more preferably from 3.0 to 10.0. Stretching can be accomplished by dry stretching in the air. Alternatively, stretching may be accomplished by wet stretching in water. The factor of stretching in dry stretching is preferably from 2.5 to 5.0 and the factor of stretching in wet stretching is preferably from 3.0 to 10.0. The stretching step may be divided into several portions, including oblique stretching, which are then effected batchwise. The batchwise execution of the stretching step makes it possible to uniformly stretch the polarizing film even at a high factor. The polarizing film may be stretched somewhat (to an extent such that crosswise shrinkage can be prevented) crosswise or longitudinally before obliquely stretched.

Stretching is accomplished by biaxial tenter stretching which is effected at steps different from right to left side. The aforementioned biaxial stretching is the same as effected in ordinary film forming method. In biaxial stretching, the film is stretched at different rates from right to left side. Thus, the binder film to be stretched needs to have different thicknesses from right to left side thereof In casting method, the die used may be tapered so that the flow rate of the binder solution is made different from right to left side.

In this manner, a binder film stretched obliquely at an angle of from 10 to 80 degrees with respect to MD direction of the polarizing film is produced.

The rubbing method is accomplished by any rubbing method which is widely used as a step of aligning the liquid crystal in LCD. In some detail, alignment is attained by rubbing the surface of the polarizing film with paper, gauze, felt, rubber or nylon or polyester fiber in a predetermined direction. In general, rubbing is effected several times using a cloth obtained by uniformly weaving fibers having a uniform length and thickness.

The rubbing method is preferably effected using a rubbing roll having a circularity of 30 µm or less, a cylindricality of 30 µm or less and a deflection (eccentricity) of 30 µm. The wrap angle of the film with respect to the rubbing roll is preferably from 0.1° to 90°. However, as disclosed in JP-A-8-160430, when the film is wound on the rubbing roll over an angle of 360° or more, stable rubbing can be effected.

In the case where a film of continuous length is subjected to rubbing, the film is preferably conveyed at a rate of from 1 to 100 m/min over a conveying machine under a constant tension. The rubbing roll is preferably swingable horizontally with respect to the running direction of the film to predetermine an arbitrary rubbing angle. The rubbing angle is predetermined within the range of from 0° to 60°. In the case where the polarizing film is used in a liquid crystal display, the rubbing angle is preferably from 40° to 50°, particularly 45°.

The polarizing film preferably has a polymer film provided on the side thereof opposite the optical anisotropic layer (optical anisotropic layer/polarizing film/polymer film).

The polymer film has a stainproofing and scratch-resistant antireflection layer provided on the uppermost surface thereof.

EXAMPLE

The invention will be further descried hereinafter in the following examples. Proper change may be made in the materials, chemicals, amount and proportion of materials, operation, etc. without departing from the spirit of the invention. Accordingly, the scope of the invention is not limited to the following specific examples.

Example 1

A liquid crystal display having the configuration shown in FIG. 1 was prepared. In some detail, an upper polarizing plate 1, an upper second optical anisotropic layer 3, an upper first optical anisotropic layer 5, a liquid crystal cell (an upper substrate 7, a liquid crystal layer 9, a lower substrate 10), a lower first optical anisotropic layer 12, a lower second optical anisotropic layer 14 and a lower polarizing plate 16 were stacked in this order as viewed in the observation direction (from above). A backlight comprising a cold cathode fluorescent lamp (not shown) was provided under the lower polarizing plate.

The members used and the method for the preparation thereof will be described hereinafter.

<Preparation of TN Mode Liquid Crystal Cell>

A liquid crystal cell having a gap (d) of 4 µm was prepared by dropwise injecting a liquid crystal material having a positive dielectric constant anisotropy into the gap between the substrates to form a liquid crystal layer 9 having Δnd of 350 nm (Δn is the refractive index anisotropy of the liquid crystal material). The twist angle of the liquid crystal cell thus prepared was 90°. The liquid crystal cell was subsequently stacked on the upper and lower polarizing plates in such an arrangement that the rubbing direction of the upper and lower substrates for the liquid crystal cell was parallel to the slow axis of the support (parallel to the casting direction).

(Preparation of Cellulose Acetate Film)

The following various components were charged into a mixing tank where they were then heated with stirring to cause dissolution. Thus, a cellulose acetate solution was prepared.

<Formulation of Cellulose Acetate Solution>

| Cellulose acetate having an acetylation of 60.7 to 61.1% | 100 parts by weight |
| Triphenyl phosphate (plasticizer) | 7.8 parts by weight |
| Biphenyl diphenyl phosphate (plasticizer) | 3.9 parts by weight |
| Methylene chloride (first solvent) | 336 parts by weight |
| Methanol (second solvent) | 29 parts by weight |
| 1-Butanol (third solvent) | 11 parts by weight |

16 parts by weight of the following retardation increasing agent, 92 parts by weight of methylene chloride and 8 parts by weight of methanol were charged into a separate mixing tank where they were then heated with stirring to prepare a retardation increasing agent solution. Subsequently, 474 parts by weight of the cellulose acetate solution and 25 parts by weight of the retardation increasing agent solution were mixed, and then thoroughly stirred to prepare a dope. The added amount of the retardation increasing agent was 6.0 parts by weight based on 100 parts by weight of cellulose acetate.

Retardation Increasing Agent

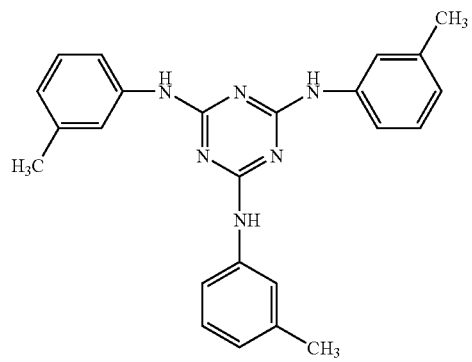

The dope thus obtained was casted using a band stretcher. When the temperature of the surface of the film on the band reached 40° C., the film was then dried with 70° C. hot air for 1 minute. The film was peeled off the band, and then dried with 140° C. drying air for 10 minutes to prepare a cellulose acetate film (thickness: 80 µm) having a residual solvent content of 0.3% by weight. The cellulose acetate film thus prepared (transparent support, transparent protective film) was then measured for Re retardation value and Rth retardation value at a wavelength of 546 nm using a Type M-150 ellipsometer (produced by JASCO). Re and Rth of the cellulose acetate film were 8 nm and 78 nm, respectively.

The cellulose acetate film thus prepared was dipped in a 2.0 N potassium hydroxide solution (25° C.) for 2 minutes, neutralized with sulfuric acid, rinsed with purified water, and then dried. The cellulose acetate film thus treated was then measured for surface energy by contact method. The surface energy of the cellulose acetate film was 63 mN/m. Thus, a cellulose acetate film for transparent protective film was prepared.

(Preparation of Alignment Layer for Second Optical Anisotropic Layer)

Using a #16 wire bar coater, a coating solution having the following formulation was spread over the cellulose acetate film at a rate of 28 mL/m². The coat layer was dried with 60° C. hot air for 60 seconds and then with 90° C. hot air for 150 seconds.

Subsequently, the film thus formed was subjected to rubbing in the direction of 45° with respect to the in-plane slow axis of the cellulose acetate film (parallel to the casting direction).

<Formulation of Coating Solution of Alignment Layer>

| | |
|---|---|
| Modified polyvinyl alcohol as shown below | 20 parts by weight |
| Water | 360 parts by weight |
| Methanol | 120 parts by weight |
| Glutaraldehyde (crosslinking agent) | 1.0 parts by weight |

Modified polyvinyl alcohol

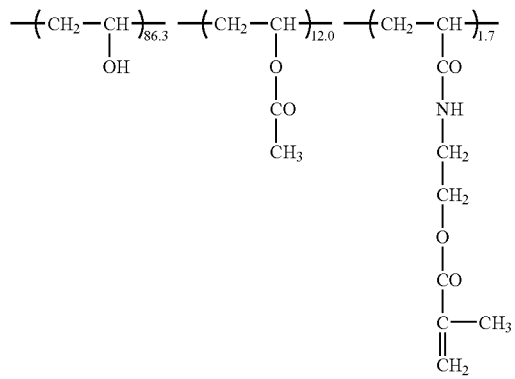

(Preparation of Second Optical Anisotropic Layer)

Using a #3.6 wire bar, a coating solution obtained by dissolving 91.0 g of the following discotic liquid crystalline compound, 9.0 g of an ethylene oxide-modified trimethylol propane triacrylate (V#360, produced by OSAKA ORGANIC CHEMICAL INDUSTRY CO., LTD.), 2.0 g of cellulose acetate butyrate (CAB551-0.2, produced by Eastman Chemical Company), 0.5 g of cellulose acetate butyrate (CAB531-1, produced by Eastman Chemical Company), 3.0 g of a photopolymerization initiator (Irgacure 907, produced by Ciba Geigy Inc.) and 1.0 g of a sensitizer (Kayacure DETX, produced by NIPPON KAYAKU CO., LTD.) in 414 g of methyl ethyl ketone was spread over the aforementioned alignment layer at a rate of 6.2 cc/m². The coat layer was heated in a 130° C. constant temperature zone for 2 minutes so that the discotic liquid crystalline compound was aligned. Subsequently, using a 120 W/cm high voltage mercury vapor lamp, the coat layer was irradiated with ultraviolet ray in a 60° C. atmosphere for 1 minute so that the discotic liquid crystalline compound was polymerized. Thereafter, the coat layer was allowed to cool to room temperature to form a second optical anisotropic layer.

Discotic Liquid Crystalline Compound

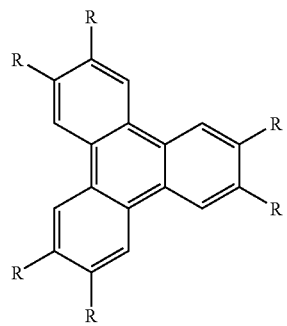

-continued

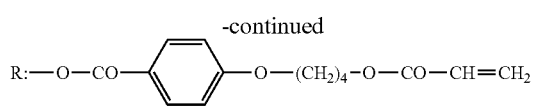

In the second optical anisotropic layer thus prepared, the discotic liquid crystalline compound was observed to have an arrangement such that the angle (tilt angle) between the surface of the disc and the transparent protective film increases from the transparent protective film toward the interface with air.

(Preparation of First Optical Anisotropic Layer)

An alignment layer was formed on the second optical anisotropic layer in the same manner as in the alignment layer for second optical anisotropic layer. Subsequently, the alignment layer thus formed was subjected to rubbing in the direction parallel to the slow axis of the cellulose acetate film.

A first optical anisotropic layer was formed on the aforementioned alignment layer in the same manner as the second optical anisotropic layer except that the amount of methyl ethyl ketone was 207 g, the amount of cellulose acetate butyrate (CAB551-0.2, produced by Eastman Chemical Company) was 3.5 g and cellulose acetate butyrate (CAB531-1, produced by Eastman Chemical Company) was not added.

In the first optical anisotropic layer thus prepared, the discotic liquid crystalline compound was observed to have an arrangement such that the angle (tilt angle) between the surface of the disc and the transparent protective film increases from the transparent protective film toward the interface with air. Thus, the discotic liquid crystalline compound was observed to make hybrid alignment at an angle of from 27° to 87°.

The first and second optical anisotropic layers each are a uniform film free of defects such as schlieren.

(Measurement of Optical Properties of Optical Compensation Film Prepared)

The optical compensation film prepared was measured for minimum transmittance at 10 sites per $m^2$ while being rotated in-plane interposed between a pair of Glan-Thompson prism polarizing elements arranged in cross nicol configuration such that the transmittance reaches minimum. As opposed to the transmittance of polarizing elements arranged in parallel nicol configuration, the optical compensation film exhibited an average minimum transmittance of 0.31% and a minimum transmittance of 0.27%, demonstrating that it showed no quenching.

(Preparation of Polarizing Film)

Iodine was adsorbed to a stretched polyvinyl alcohol film to prepare a polarizing film. The optical compensation film prepared above was stuck to one side of the polarizing film on the support side thereof with a polyvinyl alcohol-based adhesive. A cellulose triacetate film having a thickness of 80 μm (TD-80U, produced by Fuji Photo Film Co., Ltd.) was subjected to saponification, and then stuck to the side of the polarizing film opposite the optical compensation film with a polyvinyl alcohol-based adhesive. The transmission axis of the polarizing film and the slow axis of the support for the optical compensation film were arranged crossing each other. In this manner, a polarizing plate was prepared.

(Optical Measurement of Liquid Crystal Display Prepared)

A 60 Hz rectangular voltage was applied to the liquid crystal display prepared from the aforementioned members. The liquid crystal display thus prepared operated in normally white mode that performs white display at 1.5 V and black display at 3 V. The liquid crystal display was then measured for white display transmittance and black display transmittance with respect to backlight and contrast ratio which is transmittance ratio (white display/black display) using a Type BM-5 measuring instrument (produced by TOP CORPORATION). The liquid crystal display was also measured for brightness viewing angle at eight gradations obtained by equally cutting black display (L1) and white display (L8) brightness using a Type EZ-Contrast 160D measuring instrument (produced by ELDIM Inc.). The front contrast ratio, the range within which no brightness inversion occurs at downward adjacent gradations and the range within which the contrast ratio is 10 or more are set forth in Table 1. The maximum black display (L1) measured at all angles in the direction tilted at 60° from normal to the display surface was 6% of the front white display (L8) brightness.

(0092)

Example 2

A liquid crystal display was prepared in the same manner as in Example 1 except that lamination was made such that the rubbing direction of both the first and second optical anisotropic layers are arranged in the direction of 45° with respect to the in-plane slow axis of the cellulose acetate film (parallel to casting direction) and the rubbing direction of both the upper and lower substrates of TN mode liquid crystal cell are arranged in the direction of 45° with respect to the in-plane slow axis of the cellulose acetate film (parallel to casting direction).

A 60 Hz rectangular voltage was applied to the liquid crystal display thus prepared. The liquid crystal display thus prepared operated in normally white mode that performs white display at 1.5 V and black display at 3 V. The liquid crystal display was then evaluated for optical properties in the same manner as in Example 1. The results are set forth in Table 1.

Example 3

An alignment layer was formed on the cellulose acetate film in the same manner as in Example 1. The alignment layer was then subjected to rubbing in the direction of 25° with respect to the slow axis of the cellulose acetate film. A coating solution obtained in the same manner as in the formulation of the coating solution for the second optical anisotropic layer of Example 1 except that the amount of methyl ethyl ketone was 207 g and 7.5 g of the following chiral agent was added was spread over the alignment layer in the same manner as in Example 1 to form an optical anisotropic layer.

Chiral Agent

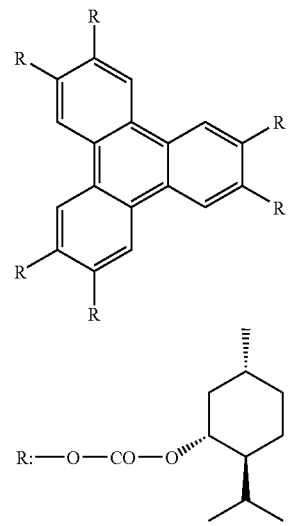

In the optical anisotropic layer thus prepared, the discotic liquid crystalline compound was observed to have an arrangement such that the angle (tilt angle) between the surface of the disc and the transparent protective film increases from the transparent protective film toward the interface with air (hybrid alignment). Thus, the discotic liquid crystalline compound was observed to make hybrid alignment at an angle of from 27° to 87°. The discotic liquid crystalline compound showed a twist angle of 25°.

Upper and lower polarizing plates were then prepared from the aforementioned optical compensation film having one optical anisotropic layer thus prepared in the same manner as in Example 1. The upper and lower polarizing plates were then stacked on a liquid crystal cell.

A 60 Hz rectangular voltage was applied to the liquid crystal display thus prepared. The liquid crystal display thus prepared operated in normally white mode that performs white display at 1.5 V and black display at 3 V. The liquid crystal display was then evaluated for optical properties in the same manner as in Example 1. The results are set forth in Table 1.

Comparative Example 1

A liquid crystal display was prepared in the same manner as in Example 1 except that the optical anisotropic layers (3, 5, 12, 14) were removed from the liquid crystal display shown in FIG. 1. A 60 Hz rectangular voltage was applied to the liquid crystal display thus prepared. The liquid crystal display thus prepared operated in normally white mode that performs white display at 1.5 V and black display at 3 V. The liquid crystal display was then evaluated for optical properties in the same manner as in Example 1. The results are set forth in Table 1.

TABLE 1

| Liquid crystal display | White brightness (cd/m²) | Black brightness (cd/m²) | Front contrast ratio | Range within which no downward brightness inversion occurs | Range within which contrast ratio is 10 or more | | | |
|---|---|---|---|---|---|---|---|---|
| | | | | | Upper | Lower | Left | Right |
| Example 1 | 232 | 0.58 | 400:1 | 60° | 80° | 80° | 80° | 80° |
| Example 2 | 232 | 1.10 | 211:1 | 50° | 70° | 80° | 80° | 80° |
| Example 3 | 232 | 0.58 | 400:1 | 70° | 80° | 80° | 80° | 80° |
| Comparative Example 1 | 238 | 7.9 | 30:1 | 30° | 10° | 70° | 80° | 80° |

As can be seen in the results shown in Table 1, the inventive examples show remarkable improvements in lower brightness inversion resistance and contrast ratio at viewing angle.

Example 4

An upper polarizing plate 1, a support made of cellulose acetate film as an upper second optical anisotropic layer 3, an upper first optical anisotropic layer 5, a liquid crystal cell (an upper substrate 7, a liquid crystal layer 9, a lower substrate 10), a lower first optical anisotropic layer 12, a support made of cellulose acetate film as a lower second optical anisotropic layer 14 and a lower polarizing plate 16 were stacked in this order as viewed in the observation direction (from above). A backlight comprising a cold cathode fluorescent lamp (not shown) was provided under the lower polarizing plate.

The members used and the method for the preparation thereof will be described hereinafter.

<Preparation of TN Mode Liquid Crystal Cell>

A liquid crystal cell having a gap (d) of 4 μm was prepared by dropwise injecting a liquid crystal material having a positive dielectric constant anisotropy into the gap between the substrates to form a liquid crystal layer 9 having Δnd of 410 nm (Δn is the refractive index anisotropy of the liquid crystal material). The twist angle of the liquid crystal cell thus prepared was the crossing angle of the rubbing direction 8 of the upper substrate 7 and the rubbing direction 11 of the lower substrate 10 and predetermined to 90° counterclockwise by the addition of a chiral agent. The liquid crystal cell was stacked on the upper and lower polarizing plates in such an arrangement that the rubbing direction of the upper and lower substrates of the liquid crystal cell and the retardation axes 4 and 15 of the supports 3 and 14 (parallel to casting direction) are parallel to each other.

(Preparation of Cellulose Acetate Film)

The following various components were charged into a mixing tank where they were then heated with stirring to cause dissolution. Thus, a cellulose acetate solution was prepared.

<Formulation of Cellulose Acetate Solution>

| | |
|---|---|
| Cellulose acetate having an acetylation of 60.9% (linter) | 80 parts by weight |
| Cellulose acetate having an acetylation of 60.8% (linter) | 20 parts by weight |
| Triphenyl phosphate (plasticizer) | 7.8 parts by weight |
| Biphenyl diphenyl phosphate (plasticizer) | 3.9 parts by weight |
| Methylene chloride (first solvent) | 300 parts by weight |
| Methanol (second solvent) | 54 parts by weight |
| 1-Butanol (third solvent) | 11 parts by weight |

4 parts by weight of a cellulose acetate (linter) having an acetylation degree of 60.9%, 16 parts by weight of the same retardation increasing agent as used in Example 1, 0.5 parts by weight of particulate silica (particle diameter: 20 nm; Mohs hardness: about 7), 87 parts by weight of methylene chloride and 13 parts by weight of methanol were charged into a separate mixing tank where they were then heated with stirring to prepare a retardation increasing agent solution.

464 parts by weight of the cellulose acetate solution and 36 parts by weight of the retardation increasing agent solution were mixed, and then thoroughly stirred to prepare a dope. The added amount of the retardation increasing agent was 5.0 parts by weight based on 100 parts by weight of cellulose acetate.

The polymer substrate (PK-1) thus obtained had a width of 1,340 mm and a thickness of 92 μm. The polymer substrate (PK-1) was then measured for retardation (Re) at a wavelength of 590 nm using a Type M-150 ellipsometer (produced by JASCO). Re of the polymer substrate was 43 nm. The polymer substrate (PK-1) was also measured for retardation (Rth) at a wavelength of 590 nm. Rth of the polymer substrate was 175 nm.

The polymer substrate (PK-1) thus prepared was also measured for moisture expansion coefficient. The moisture expansion coefficient of the polymer substrate (PK-1) was $12.0 \times 10^{-5}$/% RH.

(Preparation of Subbing Layer)

A coating solution having the following formulation was spread over the aforementioned cellulose acetate film support at a rate of 28 cc/m², and then dried to form a gelatin layer (coat layer) having a thickness of 0.1 μm.

<Formulation of Subbing Layer Coating Solution>

| | |
|---|---|
| Gelatin | 0.542 parts by weight |
| Formaldehyde | 0.136 parts by weight |
| Salicylic acid | 0.160 parts by weight |
| Acetone | 39.1 parts by weight |
| Methanol | 15.8 parts by weight |
| Methylene chloride | 40.6 parts by weight |
| Water | 1.2 parts by weight |

Using a #16 wire bar coater, a coating solution having the following formulation was spread over PK-1 at a rate of 28 ml/m². The coat layer was dried with 60° C. hot air for 60 seconds and then with 90° C. hot air for 150 seconds.

<Formulation of Coating Solution of Alignment Layer>

| | |
|---|---|
| Modified polyvinyl alcohol as used in Example 1 | 10 parts by weight |
| Water | 371 parts by weight |
| Methanol | 119 parts by weight |
| Glutaraldehyde (crosslinking agent) | 0.5 parts by weight |

The alignment layer was subjected to rubbing in the direction of 45° with respect to the slow axis (measured at a wavelength of 632.8 nm) of the polymer substrate (PK-1).

<Formation of Optical Anisotropic Layer>

Using a #3.4 wire bar, a coating solution obtained by dissolving 46.65 kg of the same discotic liquid crystalline compound as used in Example 1, 4.06 kg of an ethylene oxide-modified trimethylol propane triacrylate (V#360, produced by OSAKA ORGANIC CHEMICAL INDUSTRY CO., LTD.), 0.90 kg of cellulose acetate butyrate (CAB551-0.2, produced by Eastman Chemical Company), 0.23 kg of cellulose acetate butyrate (CAB531-1, produced by Eastman Chemical Company), 1.35 kg of a photopolymerization initiator (Irgacure 907, produced by Ciba Geigy Inc.) and 0.45 kg of a sensitizer (Kayacure DETX, produced by NIPPON KAYAKU CO., LTD.) in 102 kg of methyl ethyl ketone was spread over the aforementioned alignment layer. The coat layer was heated in a 130° C. constant temperature zone for 2 minutes so that the discotic liquid crystalline compound was aligned. Subsequently, using a 120 W/cm high voltage mercury vapor lamp, the coat layer was irradiated with ultraviolet ray in a 60° C. atmosphere for 1 minute so that the discotic liquid crystalline compound was polymerized. Thereafter, the coat layer was allowed to cool to room temperature. Thus, an optical anisotropic layer was formed to prepare an optical compensation film (KH-2).

Re retardation of the optical anisotropic layer measured at a wavelength of 546 nm in the same manner as in Example 1 was 40 nm.

In the optical anisotropic layer thus prepared, the discotic liquid crystalline compound was observed to have an arrangement such that the angle (tilt angle) between the surface of the disc and the transparent protective film increases from the transparent protective film toward the interface with air.

The optical compensation film thus obtained was then observed for unevenness with the polarizing plates arranged in cross nicol configuration. As a result, no unevenness was detected even as viewed on the front and in the direction of 60° from the normal.

<Preparation of Polarizing Film>

Iodine was adsorbed to a stretched polyvinyl alcohol film to prepare a polarizing film. The optical compensation film prepared above was stuck to one side of the polarizing film on the support side thereof with a polyvinyl alcohol-based adhesive. A cellulose triacetate film having a thickness of 80 μm (TD-80U, produced by Fuji Photo Film Co., Ltd.) was subjected to saponification, and then stuck to the side of the polarizing film opposite the optical compensation film with a polyvinyl alcohol-based adhesive.

Figure 2:
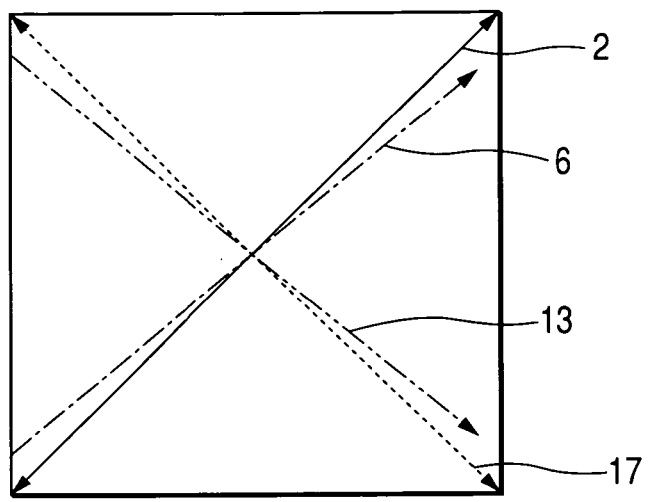
FIG. 2 is a schematic diagram illustrating the angle at which the various films are stacked in the liquid crystal display prepared in Example 4 as viewed from above.

FIG. 2 depicts the angle at which the various films are stacked in the liquid crystal display as viewed from above.

Disposition was made such that the absorption axis 2 of the upper polarizing plate 1 and the slow axis 4 of the support 3 (parallel to casting direction) are arranged substantially parallel to each other, and the absorption axis 17 of the lower polarizing plate 16 and the slow axis 15 of the support 14 (parallel to casting direction) are arranged substantially parallel to each other (not shown). Further, the crossing angle of the average alignment direction 6 of the molecular major axis in the upper first optical anisotropic layer 5 region close to the upper polarizing film and the alignment direction 8 of the upper substrate 7 of the liquid crystal cell was 3° clockwise. Similarly, the crossing angle of the average alignment direction 13 of the molecular major axis in the lower first optical anisotropic layer 12 region close to the lower polarizing film and the alignment direction 11 of the lower substrate 10 of the liquid crystal cell was 3° counterclockwise. Here, each of the alignment directions 6 and 13 is a alignment direction of the major axis of the discotic structure in the discotic crystalline compound. The front contrast ratio measured with the crossing angle of the average alignment direction 6 of the molecular major axis in the upper first optical anisotropic layer 5 region close to the upper polarizing film and the alignment direction 8 of the upper substrate 7 of the liquid crystal cell varying from −2° to +2° is set forth in Table 2 below. The counterclockwise rotation is represented by the sign "−". In each condition shown in Table 2, the alignment direction 6 of the upper optical compensation film (the upper first optical anisotropic layer 5) at a side of the upper first optical compensation film facing to the upper polarizing film (the upper polarizing plate 1) and the alignment direction 13 of the lower first optical compensation film (the lower first optical anisotropic layer 12) at a side of the lower optical compensation facing to the polarizing film (the lower polarizing plate 16) crossed each other at an angle of not greater than a crossing angle of absorption axes 2 and 17 of the pair of polarizing plates 1 and 16, as shown in FIG. 2.

TABLE 2

| | Crossing angle | | | | | | |
|---|---|---|---|---|---|---|---|
| | −2° | −1° | −0.5° | 0° | +0.5° | +1° | +2° |
| Front contrast | 50 | 100 | 200 | 300 | 500 | 700 | 400 |

(Optical measurement of liquid crystal display prepared)

A 60 Hz rectangular voltage was applied to the liquid crystal display thus prepared. The liquid crystal display thus prepared operated in normally white mode that performs white display at 1.5 V and black display at 5 V. Using a Type EZ-Contrast 160D measuring instrument (produced by ELDIM), the liquid crystal display was then measured for contrast ratio which is transmittance ratio (white display/black display). The front contrast ratio thus measured was 700:1. The range within which no brightness inversion occurs at downward adjacent gradations and the range within which the contrast ratio is 10 or more were each 80° or more at all angle ranges in the upper, lower, right and left directions.

Comparative Example 2

The procedure of Example 4 was followed except that the average alignment direction 6 of the molecular major axis in the upper first optical anisotropic layer 5 and the alignment direction 8 of the upper liquid crystal substrate 7 are arranged substantially parallel to each other and the average alignment direction 13 of the molecular major axis in the lower first optical anisotropic layer 12 and the alignment direction 11 of the lower liquid crystal substrate 10 are similarly arranged substantially parallel to each other, such that the alignment direction 6 of the upper optical compensation film (the upper first optical anisotropic layer 5) at a side of the upper first optical compensation film facing to the upper polarizing film (the upper polarizing plate 1) and the alignment direction 13 of the lower first optical compensation film (the lower first optical anisotropic layer 12) at a side of the lower optical compensation film facing to the polarizing film (the lower polarizing plate 16) did not cross each other at an angle of not greater than a crossing angle of absorption axes 2 and 17 of the pair of polarizing plates 1 and 16. As a black display voltage, a 60 Hz rectangular voltage varying from 4 V to 10 V was applied to the liquid crystal display. The liquid crystal display was measured for contrast ratio at a white display voltage of 1.5 V. The results are set forth in Table 3 below. The black voltage was normally predetermined to 5 V due to requirements for the reduction of power consumption of driving IC. The contrast thus measured was 300:1.

TABLE 3

|  | Black voltage | | | | | |
| --- | --- | --- | --- | --- | --- | --- |
|  | 4 V | (5 V) | 6 V | 7 V | 8 V | 9 V | 10 V |
| Front contrast | 20 | 300 | 400 | 500 | 600 | 700 | 800 |

Example 5

Figure 3:
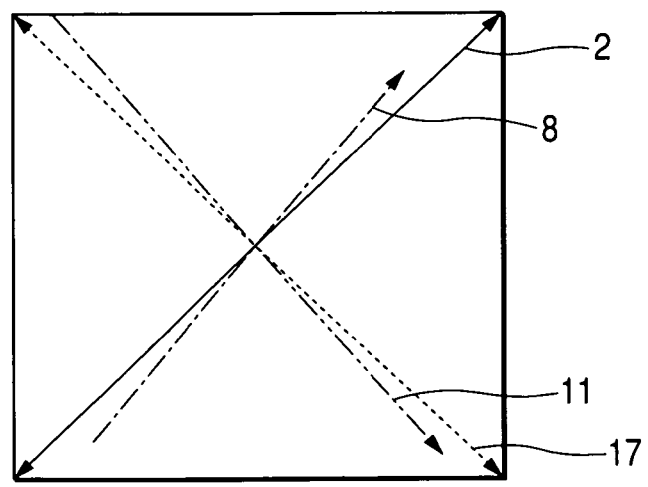
FIG. 3 is a schematic diagram illustrating the angle at which the various films are stacked in the liquid crystal display prepared in Example 5 as viewed from above.

FIG. 3 depicts the angle at which the various films in the present example are stacked in the liquid crystal display as viewed from above. Disposition was made such that the average alignment direction 6 of the molecular major axis in the upper first optical anisotropic layer 5 region close to the upper polarizing film and the slow axis 4 of the upper support (upper second optical compensation layer) 3 are arranged substantially parallel to each other and the average alignment direction 15 of the molecular major axis in the lower first optical anisotropic layer 14 region close to the lower polarizing film and the slow axis 15 of the lower support (lower second optical compensation layer) 14 are similarly arranged substantially parallel to each other. Further, the crossing angle of the rubbing direction 8 of the upper substrate 7 of the liquid crystal cell and the absorption axis 2 of the upper polarizing film 1 was 2° counterclockwise. Moreover, the twist angle of the liquid crystal layer 9 was arranged to 94° counterclockwise by the incorporation of a chiral agent in the liquid crystal layer 9. The other constitutions were the same as in Example 4. Thus, a liquid crystal display was prepared.

The liquid crystal display was then measured for contrast ratio at a black display voltage of 5 V in the form of 60 Hz rectangular voltage and a white display voltage of 1.5 V. The contrast ratio of the liquid crystal display was 600:1. Table 4 shows the contrast measured with the twist angle of the liquid crystal layer varying from 86° to 100°. The counterclockwise rotation is represented by the sign "−".

TABLE 4

|  | Twist angle of LCD | | | | | |
| --- | --- | --- | --- | --- | --- | --- |
|  | 86° | 88° | 90° | 92° | 94° | 96° |
| Front contrast | 75 | 150 | 300 | 500 | 700 | 350 |

Example 6

An alignment layer was formed on a cellulose acetate film in the same manner as in Example 4. A coating solution obtained in the same manner as in the formulation of optical anisotropic layer of Example 4 except that the amount of methyl ethyl ketone was 207 g and 7.5 g of the same chiral agent as used in Example 1 was added was spread over the alignment layer, and then polymerized to form an optical anisotropic layer.

In the optical anisotropic layer thus prepared, the discotic liquid crystalline compound was observed to have an arrangement such that the angle (tilt angle) between the surface of the disc and the transparent protective film increases from the transparent protective film toward the interface with air. Thus, the discotic liquid crystalline compound was observed to make hybrid alignment at an angle of from 27° to 87°.

The liquid crystal display was prepared. The various films in the present example were stacked such that the angle between the average alignment direction 6 of the molecular major axis in the upper first optical anisotropic layer 5 resion close to the upper support 3 and the slow axis 4 of the upper support 3 is 4° clockwise and the average alignment direction of the molecular major axis of in the upper first optical anisotropic layer 5 region close to the liquid crystal cell and the slow axis 4 of the upper support 3 are arranged substantially parallel to each other. Similarly, the angle between the average alignment direction of the molecular major axis in the lower first optical anisotropic layer 12 region close to the support and the slow axis 15 of the lower support 14 was 4° counterclockwise and the average alignment direction 11 of the molecular major axis in the lower first optical anisotropic layer 12 region close to the liquid crystal cell and the slow axis 15 of the lower support 14 were arranged substantially parallel to each other.

The liquid crystal display was then measured for contrast ratio at a black display voltage of 5 V in the form of 60 Hz rectangular voltage and a white display voltage of 1.5 V. The contrast ratio of the liquid crystal display was 600:1. Table 5 shows the contrast measured with the crossing angle of the average alignment direction of the molecular major axis in the optical anisotropic layer region close to the support and the average alignment direction of the molecular major axis in the optical anisotropic layer region close to the liquid crystal layer varying from 0° to 10°. The counterclockwise rotation is represented by the sign "−".

TABLE 5

|  | Crossing angle | | | | | |
| --- | --- | --- | --- | --- | --- | --- |
|  | −6° | −4° | −2° | 0° | +2° | +4° |
| Front contrast | 700 | 600 | 400 | 300 | 200 | 120 |

The present application claims foreign priority based on Japanese Patent Application No. JP2004-91862, filed Mar. 26 of 2004, the contents of which is incorporated herein by reference.

What is claimed is:

1. A liquid crystal display comprising:
an upper polarizing plate and a lower polarizing plate;
a liquid crystal cell between the pair of the polarizing plates, the liquid crystal cell comprising: a pair of substrates facing to each other, at least one of the pair of the substrates having an electrode; and a liquid crystal layer between the pair of the substrates, the liquid crystal layer having a twisted structure of a liquid crystal;
wherein
the upper polarizing plate comprises an upper optical compensation film; an upper polarizing film; and a protective film in this order, the upper optical compensation film being between the upper polarizing film and the liquid crystal cell;
the lower polarizing plate comprises a lower optical compensation film; a lower polarizing film; and a protective film in this order, the lower optical compensation film being between the lower polarizing film and the liquid crystal cell; and
each of the upper and lower optical compensation films comprises: a first optical anisotropic layer including a compound having a discotic structure unit; and a second optical anisotropic layer;
wherein
when at least one of the upper optical compensation film and the lower optical compensation film is removed from the liquid crystal display leaving the other constitutions unchanged, the liquid crystal display has a ratio of T2(Vw) to T2(Vb) of less than 100:1, wherein T2(Vw) represents a transmittance from an anterior view in a white display state at an applied voltage Vw, Vw represents an applied voltage so as to provide the white display state, T2(Vb) represents a transmittance from an anterior view in a black display state at an applied voltage Vb, and Vb represents an applied voltage so as to provide the black display state;
the at least one optical compensation film satisfies a condition that when the at least one optical compensation film is interposed between a pair of polarizing elements arranged in cross nicol configuration to provide a layer product, and the optical compensation film is rotated on a direction normal to a surface of the at least one optical compensation film as a rotary axis, the layered product has a light transmittance of more than zero at all angles of rotation;
the liquid crystal display has a ratio of T1(Vw) to T1(Vb) of 100:1 or more, wherein T1(Vw) represents a transmittance from an anterior view in the white display state at the applied voltage Vw, and T1(Vb) represents a transmittance from an anterior view in the black display state at the applied voltage Vb; and
the liquid crystal display has a ratio of a maximum value of the transmittance in the black display state to T1(Vw) of 10% or less at an azimuth angle of 60° from a direction normal to the substrates; and
wherein
the compound having a discotic structure unit is aligned such that:
the first optical anisotropic layer in the upper optical compensation film has an average alignment direction of a molecular major axis of the discotic structure unit,
the first optical anisotropic layer in the lower optical compensation film has another average alignment direction of the molecular major axis of the discotic structure unit, and
the alignment direction of the first optical anisotropic layer of the upper optical compensation film at a side of the first optical anisotropic layer of the upper optical compensation film facing to the upper polarizing film and the other alignment direction of the first optical anisotropic layer of the lower optical compensation film at a side of the first optical anisotropic layer of the lower optical compensation facing to the lower polarizing film cross each other at an angle of not greater than a crossing angle of absorption axes of the upper and lower polarizing plates;
wherein the crossing angle of the alignment directions of the upper and lower optical compensation films is equal to or smaller than a twist angle of the twisted structure by more than 0 and 6 degrees or less.

2. The liquid crystal display according to claim 1, wherein the optical compensation film comprises: a first optical anisotropic layer; and a second optical anisotropic layer, each of the first and second optical anisotropic layers comprising a liquid crystalline compound; and
the first optical anisotropic layer has an alignment direction of the liquid crystalline compound, the second optical anisotropic layer has another alignment direction of the liquid crystalline, and the alignment directions of the first and second optical anisotropic layer differ from each other.

3. An optical compensation film as defined in claim 2.

* * * * *